United States Patent [19]
Hoshino et al.

[11] Patent Number: 5,539,723
[45] Date of Patent: Jul. 23, 1996

[54] METHOD, APPARATUS, AND MEDIUM FOR RECORDING INFORMATION IN DATA SECTIONS HAVING NUMBER OF BYTES WHICH INCREASE IN CIRCUMFERENCE OF TRACKS ON MEDIUM

[75] Inventors: Takashi Hoshino, Yokohama; Tetsuya Ikeda, Chigasaki; Junichi Ishii, Narashino, all of Japan

[73] Assignee: Hitachi, Ltd., Tokyo, Japan

[21] Appl. No.: 513,236

[22] Filed: Aug. 10, 1995

Related U.S. Application Data

[63] Continuation of Ser. No. 337,445, Nov. 8, 1994, Pat. No. 5,459,710, which is a continuation of Ser. No. 911,677, Jul. 9, 1992, Pat. No. 5,388,090.

[30] Foreign Application Priority Data

Jul. 9, 1991 [JP] Japan .................................. 3-168025
Mar. 12, 1992 [JP] Japan .................................. 4-053282

[51] Int. Cl.⁶ .............................. G11B 7/24; G11B 11/00
[52] U.S. Cl. ............................ 369/275.3; 369/13; 369/48
[58] Field of Search ........................ 369/275.3, 275.1, 369/275.4, 13, 32, 276, 48, 49, 44.26, 44.28, 59, 54, 124, 47, 58; 360/59, 114

[56] References Cited

U.S. PATENT DOCUMENTS

| | | | |
|---|---|---|---|
| 5,056,080 | 10/1991 | Russell | 369/44.26 |
| 5,128,916 | 7/1992 | Ito et al. | 369/44.26 |
| 5,172,357 | 12/1992 | Taguchi | 369/48 |
| 5,278,814 | 1/1994 | Deguchi et al. | 369/47 |
| 5,327,406 | 7/1994 | Sako | 369/32 |
| 5,388,090 | 2/1995 | Hoshino et al. | 369/275.3 |
| 5,459,710 | 10/1995 | Hoshino et al. | 369/275.3 |

FOREIGN PATENT DOCUMENTS

| | | |
|---|---|---|
| 61-172223 | 8/1986 | Japan . |
| 61-175968 | 8/1986 | Japan . |
| 1-128276 | 5/1989 | Japan . |
| 1-204272 | 8/1989 | Japan . |
| 2-162578 | 6/1990 | Japan . |
| 2-260285 | 10/1990 | Japan . |
| 3-187072 | 8/1991 | Japan . |

*Primary Examiner*—Ali Neyzari
*Attorney, Agent, or Firm*—Antonelli, Terry, Stout & Kraus

[57] ABSTRACT

An information recording and reproducing method and apparatus with increased recording density of an information recording medium using the sample servo method driven with a fixed angular velocity from the innermost circumference to the outmost circumference. A disk-shaped recording medium is concentrically divided into a plurality of areas. Recording is performed with a recording density suited for the radial position of each of the areas. The width of the areas is set so that the recording capacity of a user data section sandwiched between servo sections forming a segment may increase with every transition to an outer adjacent area while taking one byte as a unit. The recording and reproducing apparatus has a clock generating circuit for servo data extraction and a clock generating circuit for user data extraction. The latter clock generating circuit is synchronized by a synchronizing pulse generated by the former clock generating circuit.

7 Claims, 30 Drawing Sheets

SERVO CLOCK GENERATING CIRCUIT 10

DATA CLOCK GENERATING CIRCUIT 11

F I G. 16
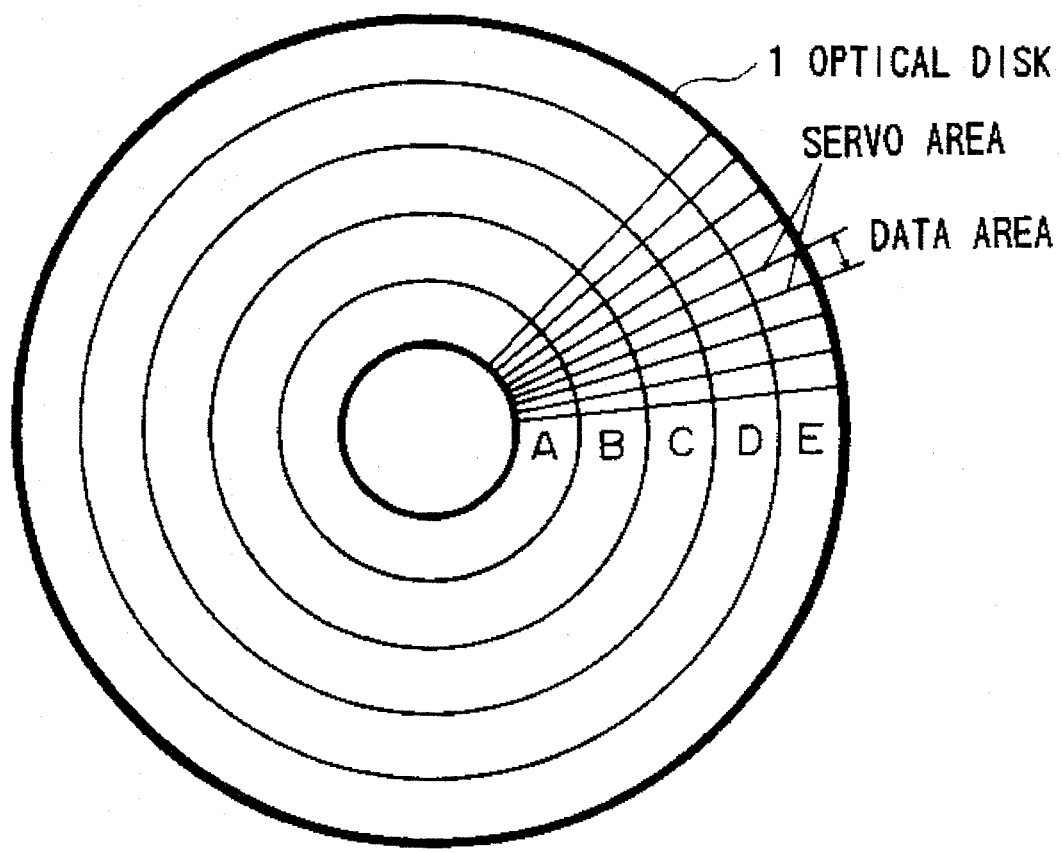

CLOCK PIT DETECTION CIRCUIT 9

CLOCK PIT DETECTION CIRCUIT 9

METHOD, APPARATUS, AND MEDIUM FOR RECORDING INFORMATION IN DATA SECTIONS HAVING NUMBER OF BYTES WHICH INCREASE IN CIRCUMFERENCE OF TRACKS ON MEDIUM

This is a continuation of application Ser. No. 08/337,445 filed on Nov. 8, 1994, now U.S. Pat. No. 5,459,710, which is a continuation of application Ser. No. 07/911,677 filed on Jul. 9, 1992, now U.S. Pat. No. 5,388,090.

BACKGROUND OF THE INVENTION

The present invention relates to an information recording medium, an information recording and reproducing method, and an information recording and reproducing apparatus, and in particular to an information recording medium, an information recording and reproducing method, and an information recording and reproducing apparatus suitable for optical disks and optical disk drive apparatuses using the sample servo method.

Conventionally, in optical disk apparatuses, the tracking method has been frequently used. In the tracking method, a groove is provided on a disk and control is exercised so that an optical beam may be positioned on this groove. In this case, a control error signal is continuously obtained by detecting light diffracted by the groove from reflected light of the optical beam, and this method is called the continuous servo method. This continuous servo method has a problem that the difference in shape and reflectance between grooves affects the control error signal and worsens the tracking precision. At the time of recording, an optical beam having a larger quantity of light than that at the time of reading is incident and hence the quantity of reflected light is increased in proportion to the quantity of incident light. This necessitates such a contrivance as to obtain a proper control error signal.

In the sample servo method, however, a sample servo format is used instead of the groove as means for obtaining the control error signal, a servo section and a data section are alternately disposed on tracks of a disk, and control is so exercised that an optical beam may be passed over the servo section. As for the control error signal, one set of tracking pits (two tracking pits) disposed so as to be offset around the track position in directions which are opposite to each other are recorded beforehand in the servo section. By detecting the difference between quantities of light reflected by the disk when the optical beam passes through both pits, the control error signal is obtained. In the sample servo system, therefore, there is no influence due to the groove because there is no groove. Further, the control error signal is derived only from the servo section, and only the operation for obtaining servo information is conducted in this area. Therefore, the influence of increase of the quantity of laser light at the time of recording is avoided. Some problems of the continuous servo method are thereby solved.

On the other hand, information recording and reproducing apparatuses such as optical disks and magnetic disks are demanded to have larger capacities with an increase in quantity of information to be dealt with. For this purpose, the recording density on disks must be increased. In the so-called CAV (Constant Angular Velocity) method of conducting a recording/reproducing operation while rotating a disk at a constant angular velocity, the space between pits (pit period) is limited at the innermost circumference where the linear velocity becomes the slowest. Therefore, the out the circumference is located the larger is the allowance between pits. In a circumference having a diameter which is twice that of the innermost circumference, for example, the recording density is decreased to ½. Thus, in the CAV method, the recording capability of the disk is not used sufficiently, resulting in waste.

In contrast, the CLV (Constant Linear Velocity) method of keeping the linear velocity constant produces the same recording density from inner circumferences to outer circumferences and hence provides the maximum recording capacity. In the CLV method, however, the angular rotational velocity of the disk must be changed according to the track position in order to keep the linear velocity constant and hence the access time becomes longer than that of the CAV method. This hinders its use as a computer memory, of which high-speed access performance is required. As one of methods aiming at eliminating drawbacks of both methods, therefore, an apparatus in which a disk is divided into a plurality of areas in the radial direction and different angular velocities are set for respective areas so as to increase the recording density, is described in JP-A-61-172223. Further, an apparatus in which a disk is divided into a plurality of areas in the same way and the recording density is increased by changing the pit period in each area while keeping the angular velocity constant is described in JP-A-61-175968. However, neither of them makes mention of the tracking method.

Further, as an example of an apparatus for dividing a disk into a plurality of areas in the radial direction and conducting a recording/reproducing operation in the same way, JP-A-1-128276 can be mentioned. This relates to an optical disk apparatus using the sample servo method. Over the entire face of the disk, the sample period of servo information is not changed but is fixed. Only the frequency of the data section in each of a plurality of divided areas is changed so as to increase the recording density of each area. Reference may further be made to JP-A-1-204272, JP-A-2-162578, JP-A-2-260285 and JP-A-3-187072 published on Aug. 15, 1991.

SUMMARY OF THE INVENTION

In the sample servo method, it is necessary to derive servo information from the servo section at a fixed period-as described before. Therefore, a higher density cannot be attained by using the method of arbitrarily setting areas and changing the speed of rotation or changing the recording clock period as in the above described prior art intended for the continuous servo method. Especially, consideration must be given to generation of the clock for obtaining servo information which should be constant over the entire face of the disk and the recording/generating clock which changes according to the radius. Consideration must also be given to the fact that the data section is divided by the servo section.

Therefore, an object of the present invention is to solve the above described problems of the prior art and provide an improved information recording medium, an information recording and reproducing method, and an information recording and reproducing apparatus capable of attaining a higher density and increasing the recording capacity while making the most of the characteristics of the sample servo method.

In an information recording and reproducing apparatus according to the present invention, a servo section is disposed on an optical disk medium at fixed angular intervals so that servo information may be obtained from the disk, which rotates at constant angular velocity, at fixed periods. The optical disk medium is divided into a plurality of bands in the radial direction. The information recording and reproducing apparatus includes a servo clock generating circuit for generating a clock which is used to obtain servo information and which is identical over the entire face of the disk, a data clock generating circuit for generating a clock which is used to record/reproduce data and which differs from band to band, and a sector detection circuit for detecting sectors, which are different in data capacity and the number per circumference from band to band.

With the clock obtained by the servo clock generating circuit, reproduction of the servo area and position control of the optical pickup are conducted. In order to increase the recording density of each band, the data clock generating circuit generates a clock having a period which becomes shorter as the band is located on the side of an outer circumference of the optical disk medium. The data recording period is so chosen as to have an integer ratio with respect to the period of the servo section. Partitions between bands are formed so that the capacity of a data area sandwiched between servo areas may increase for each transition to an adjacent outer band while taking a predetermined fixed number of bytes as the unit.

BRIEF DESCRIPTION OF THE DRAWINGS

FIG. 16 shows a second example of a configuration of a disk according to the present invention and is a schematic plan view of a medium having a recording and reproducing area divided into a plurality of bands in the radial direction;

DESCRIPTION OF THE PREFERRED EMBODIMENTS

<Embodiment 1>

By referring to FIGS. 1 to 10, examples of application of an information recording medium of the present invention, its recording and reproducing method, and an information recording and reproducing apparatus for driving it to an optical magnetic disc and an optical magnetic disk drive apparatus will now be described.

Figure 1:
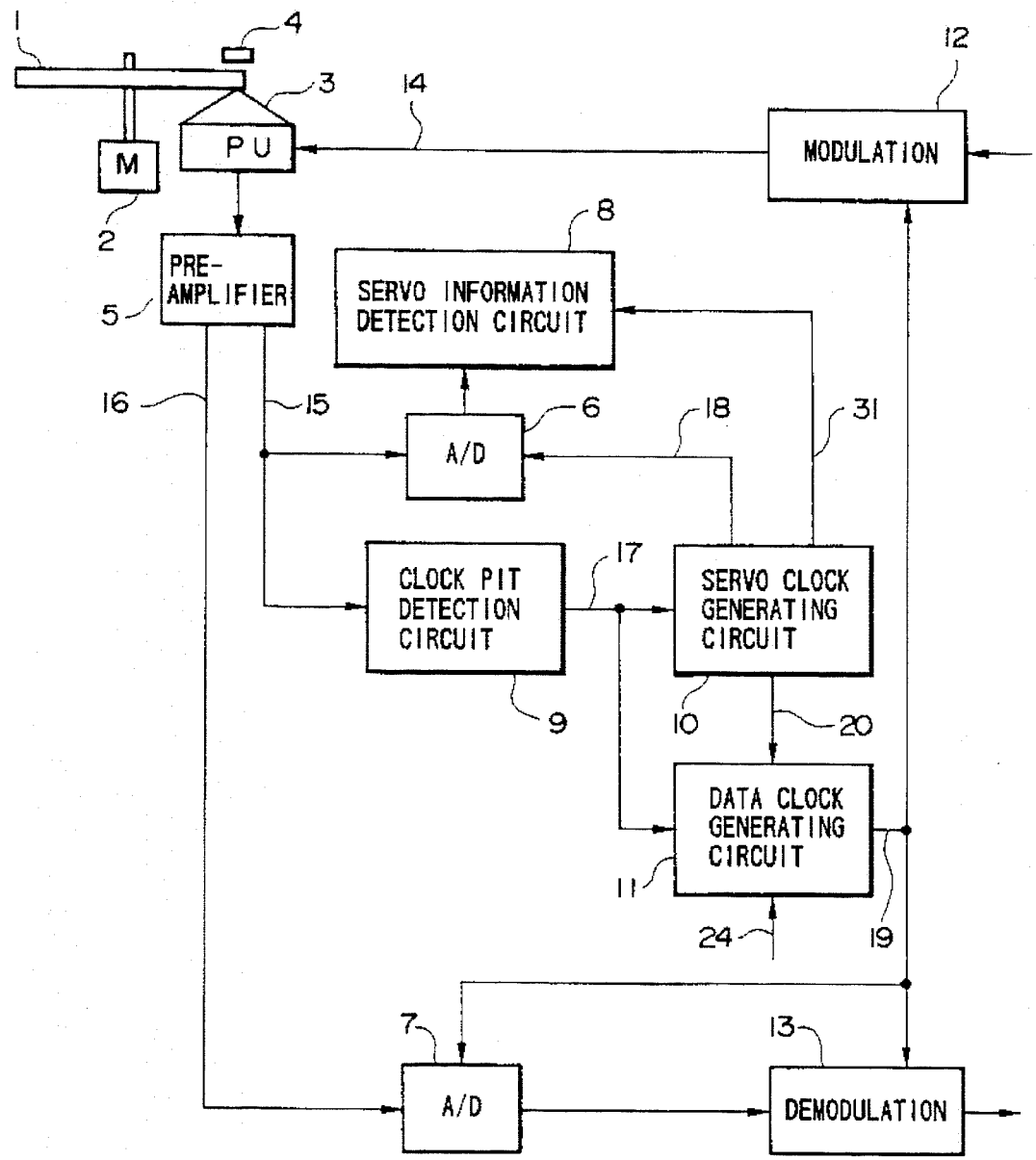
FIG. 1 is a first block configuration diagram of an information recording and reproducing apparatus according to the present invention.

(1) Examples of Configuration of Information Recording and Reproducing Apparatus FIG. 1 is a block diagram showing an example of an optical magnetic disk drive apparatus functioning as an information recording and reproducing apparatus of the present invention. By referring to FIG. 1, the outline of the apparatus configuration will now be described. In FIG. 1, portions having no direct relations to the present invention are not illustrated.

Numeral 1 denotes an optical disk functioning as an information recording medium of the present invention which will be described later in detail. Numeral 2 denotes a spindle motor for rotating the disk 1 with a constant angular velocity. Numeral 3 denotes an optical pickup, 4 a magnetic head for generating a magnetic field at the time of recording or erasing, 5 a preamplifier, 6 an A/D converter for converting a prepit signal to a digital signal, 7 an A/D converter for converting an optical magnetic signal reproduced by an optical magnetic effect to a digital signal, 8 a servo information detection circuit, 9 a clock pit detection circuit, 10 a servo clock generating circuit, 11 a data clock generating circuit, 12 a modulation circuit, and 13 a demodulation circuit. Further, numeral 14 denotes modulated data to be recorded, 15 reproduced prepit data, 16 a reproduction signal obtained by the optical magnetic effect, 17 a clock pit detection signal, 18 a servo clock, 19 a data clock, and 31 a servo information detection timing signal.

(2) Examples of Information Recording Medium

Figure 2:
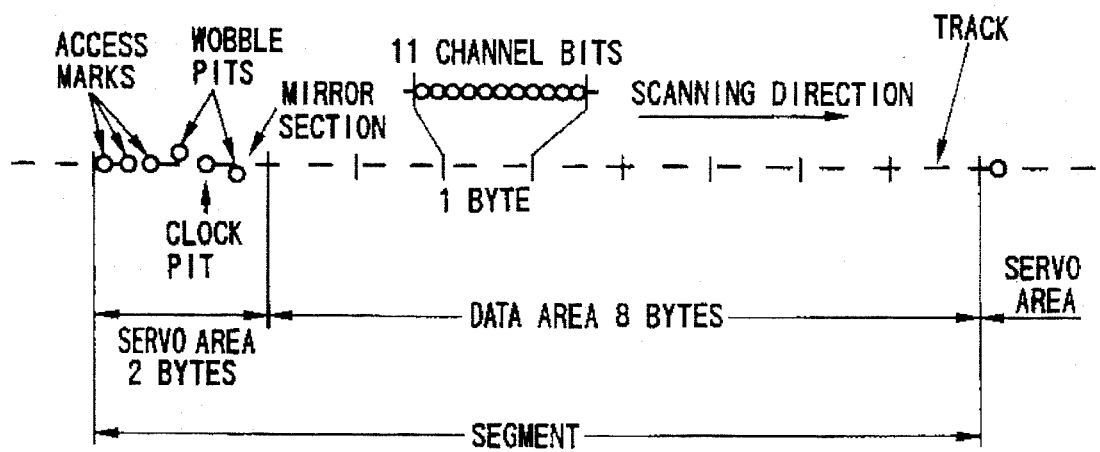
FIG. 2 is a format configuration diagram of a disk using the sample servo method.

As an example of a format of the sample servo method, FIG. 2 shows a DBF (Discrete Block Format) scheme proposed in ISO standards (ISO/IEC JTC1 Information Technology—90 mm Rewritable Optical Disk Cartridge, JTC1/SC23/WG2 1st DP10090).

In the sample servo method, the disk face is divided into servo areas and data areas in the track direction as shown in FIG. 2. In the track scanning direction, the servo areas and the data areas are alternately disposed. When they are viewed on the disk face, the servo areas are arranged so as to form straight lines in the radial direction of the disk at intervals of fixed angles. A servo area includes six prepits. The first three pits are pits for obtaining a track crossing signal in the seek operation and they are called access marks. The last three pits are servo pits. Among the servo pits, two pits are disposed so as to be offset on both sides of the track center. A central pit is recorded on the track center. The offset pits are called wobble pits. By controlling position of the optical pickup so that quantities of light reflected by the wobble pits become equal, tracking onto the track is made possible. The central pit is called a clock pit and it is used as a reference signal for clock generation. In addition, a mirror section having no pits recorded therein is set in the last portion of the servo area. A focus error signal can be derived from the mirror section. A combination of the mirror section and a sector mark which will be described later forms a unique pattern for detecting the servo area. By such a format, an operation for obtaining a servo signal and an operation for recording and reproducing data can be separated temporally. As compared with the continuous servo method whereby a groove is provided and traced, therefore, a more stable optical disk and drive apparatus can be realized.

Figure 3:
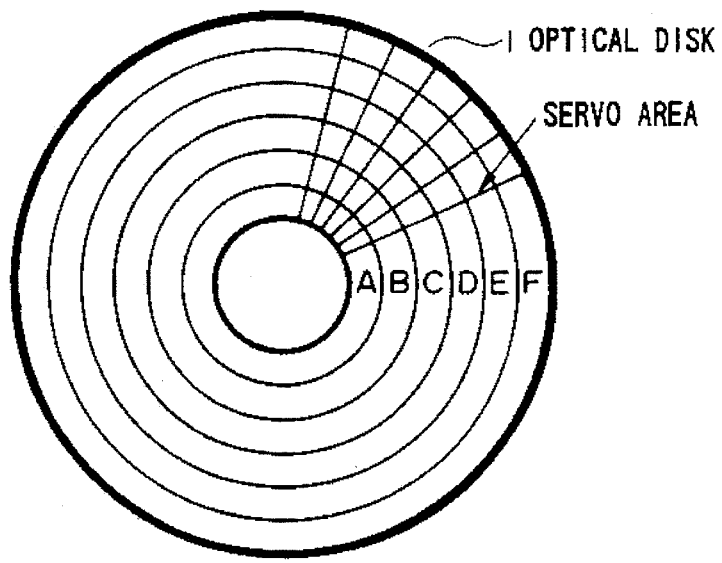
FIG. 3 shows a first example of a configuration of a disk according to the present invention and is a schematic plan view of a medium having a recording and reproducing area divided into a plurality of bands in the radial direction.

An example in which the present invention has been applied to the optical disk of this sample servo method is shown in FIG. 3. FIG. 3 shows an example in which a recording and reproducing area is divided into six portions A to F in the radial direction of the disk. In general, the larger the number of divisions becomes, the larger capacity can be obtained. As described later, however, there is a limit in implementation. In FIG. 3, bands are defined by definite partition lines. However, they are shown only for the purpose of explanation. Virtual partition lines may be used because there are no tracking grooves in fact.

Figure 4:
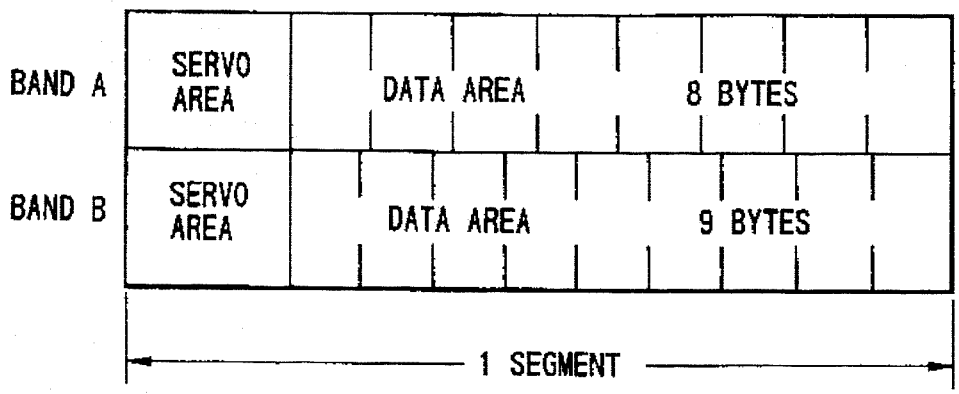
FIG. 4 is a configuration diagram of segments located near a boundary between bands.

FIG. 4 shows an expanded view of a boundary portion between bands A and B. In the band A located on the innermost circumference side, data of 8 bytes are recorded in the data area. In the adjacent band B located on the outer circumference side, however, data of 9 bytes are recorded. By narrowing the width of the band to half of that of FIG. 3, for example, it is also possible to record data of 8.5 bytes. In case a group code taking 1 byte as the unit is used as the recording modulation code, however, a data space of 0.5 byte cannot be used. Therefore, it is efficient to set bands so that the quantity of data may increase while taking one byte as the unit. In the same way, data of 10, 11, 12 and 13 bytes are recorded in other bands C to F of the disk shown in FIG. 3, respectively.

Figure 5:
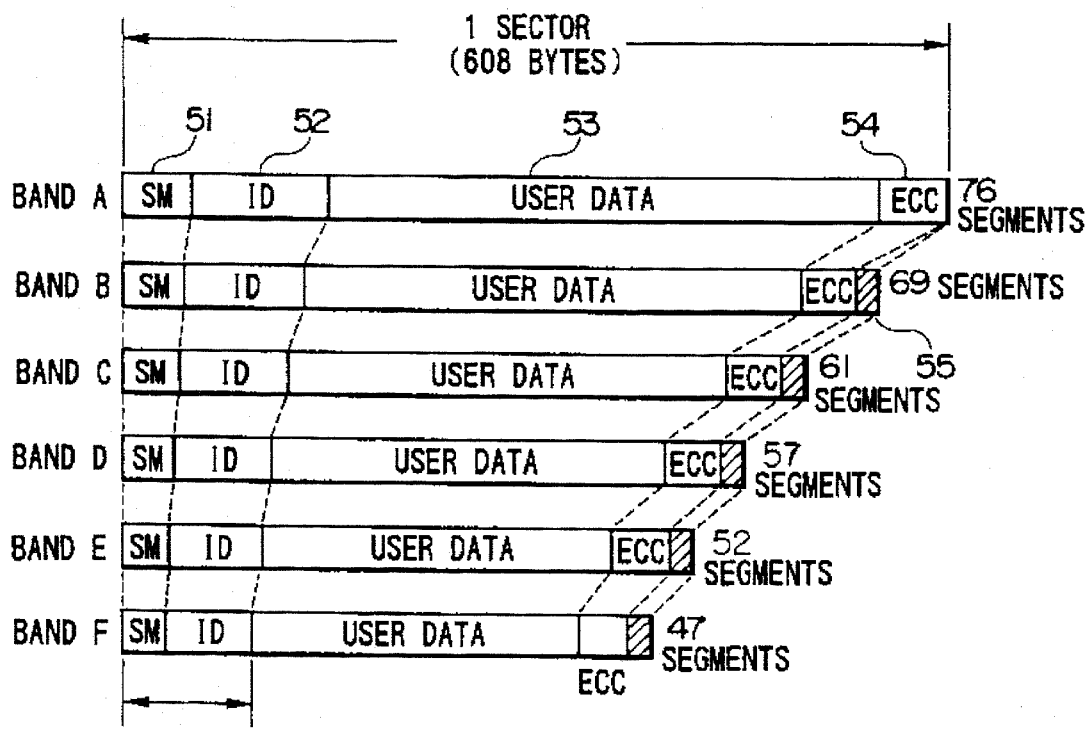
FIG. 5 is a configuration diagram of sectors.

An area having a combination of a servo area and a data area is referred to as segment. A collection of a plurality of segments forms a sector. An actual data recording/reproducing operation is conducted by taking a sector as a recording/reproducing unit. That is, the actual data recording/reproducing operation is conducted for one or more entire sectors at a time. FIG. 5 shows an example of a configuration of a sector. In FIG. 5, the length of a sector in each band is represented by the number of segments in use. The further out the band is located the larger number of data can be recorded in each segment and hence the smaller number of segments form each sector. At the head of a sector, a sector mark (SM) 51 is disposed. Subsequently as ID information 52, position information such as a track number and a sector number and other accompanying information are recorded. Subsequently, user data 53 to be used directly by the user and an error correction code (ECC) 54 for performing error correction at the time of reproduction are recorded. As the user data 53, a power of 2 such as 512 bytes or 1024 bytes is typically set. In the example of FIG. 5, 2 bytes for the sector mark, 22 bytes for the ID information, 512 bytes for the user data, and 72 bytes for the ECC form each sector. That is to say, 608 bytes in total form each sector.

In the disk 1 of FIG. 3, 1672 segments are disposed in each circumference of the disk. In the band A, each track is divided into 22 sectors and each sector is formed by 76 segments. Therefore, a surplus area is not generated.

In the band B, data of 9 bytes are recorded in the data area included in each segment. Therefore, each track is divided into 24 sectors and each sector is formed by 69 segments. In this case, each sector has a capacity of 621 bytes. However, the required capacity is 608 bytes and remaining 13 bytes (surplus area 55) are not used. Further, in this band, a surplus of 16 segments is generated every track. In the same way, other bands also have the configuration as shown in Table 1.

TABLE 1

First example of division

| Band | The number of tracks | The number of sectors per track | Capacity [MByte] |
| --- | --- | --- | --- |
| A | 2000 | 22 | 22 |
| B | 2000 | 24 | 24 |
| C | 2000 | 27 | 27 |
| D | 2000 | 29 | 29 |
| E | 2000 | 32 | 32 |
| F | 667 | 35 | 11.7 |
| Total | | | 145.7 |
| CAV capacity | | | 117.3 |
| MCAV/CAV | | | 1.24 |

Capacity = (The number of tracks) × (The number of sectors per track) × (User data quantity of 512 bytes)

It is assumed in Table 1 that the recording area in the radial direction of the disk of 3.5 inch is 24–40 mm and the track pitch is 1.5 µm. A recording capacity equivalent to 1.24 times as large as that of a conventional CAV disk (i.e., the case where the number of sectors per track is 22 in every band) is obtained.

As another example, in case a where each segment has a servo area of 2 bytes and a data area of 16 bytes and one circumference of the disk has 1672 segments under a similar condition, a capacity equivalent to 1.27 times is obtained as shown in Table 2.

TABLE 2

Second example of division

| Band | The number of tracks | The number of sectors per track | Capacity [MByte] |
| --- | --- | --- | --- |
| A | 1000 | 44 | 22 |
| B | 1000 | 46 | 23 |
| C | 1000 | 49 | 24.5 |
| D | 1000 | 52 | 26 |
| E | 1000 | 53 | 26.5 |
| F | 1000 | 57 | 28.5 |
| G | 1000 | 59 | 29.5 |
| H | 1000 | 61 | 30.5 |
| I | 1000 | 64 | 32 |
| J | 1000 | 69 | 33 |
| K | 667 | | 23.0 |
| Total | | | 298.5 |
| CAV capacity | | | 234.7 |
| MCAV/CAV | | | 1.27 |

Figure 6:
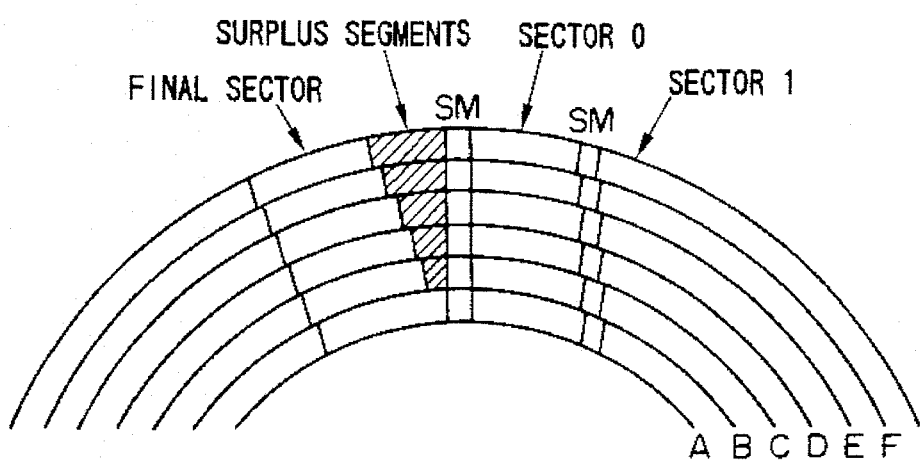
FIG. 6 is a diagram showing an example of a disk in which head positions of sectors including one sector every track are aligned in the radial direction.

As another example, FIG. 6 shows a recording medium on which head positions of sectors including one sector of every track are aligned in the radial direction. For finding out the head of a sector, it is necessary to detect a sector mark (SM) first of all. As the sector mark, a pattern which does not appear in other data is typically used. In actual reproduction of a disk, however, the same pattern as the sector mark is detected in some cases due to a stain or defect. In an adopted technique, therefore, a detection window exploiting a past record is generated and only a sector mark detection signal which has appeared in this detection window is adopted as a correct one. For obtaining a correct detection window, however, a pull-in time of a certain degree is required to obtain a correct detection window. In the above described recording medium, however, the sector period differs from band to band. In a case where a seek operation has been conducted beyond a boundary between bands, therefore, a sector mark detection operation must be conducted from the initial state. In the present example, sector marks are located at the same position at the rate of one location per circumference. Therefore, the detection window for this sector mark can be used in common to all bands. By using the sector mark detected by this detection window as a standard, sector mark detection according to the period of each band can be immediately performed. As a result, the pull-in time can be shortened. As a matter of course, the presence of sector marks in a larger number of common positions enhances the stability of the detection window and provides a better result. However, it is important to dispose sector marks in at least one common position.

Figure 7:
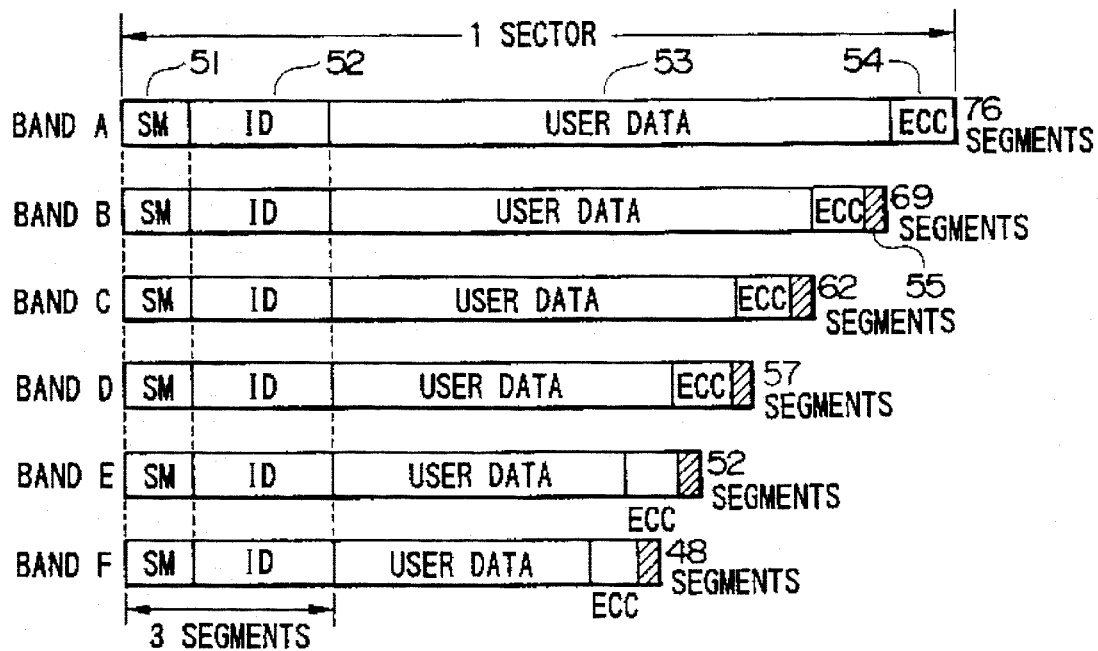
FIG. 7 is a sector configuration diagram of a disk in which ID sections are preformatted with the same density as that of servo areas.

Another embodiment of an information recording medium is shown in FIG. 7. In this example, the sector mark 51 and the ID 52 disposed at the head of each sector are recorded with the same recording density as that of the servo area at all times. Therefore, the same number of segments are occupied at all times. Also, in a case where a seek operation is conducted beyond a boundary between bands, the track number and sector number contained in ID 52 can be immediately read without switching the clock, resulting in an effect of shortened seek time. However, the recording capacity is somewhat lowered. As compared with the example shown in Table 1, the capacity becomes 144.3 MBytes, which is 1.23 times that of the CAV method.

By referring to FIGS. 3 to 7, examples of an information recording medium have heretofore been described. In the following (3), an operation for actually driving optical magnetic disks illustrated in FIGS. 3 to 7 by using the information recording and reproducing apparatus shown in FIG. 1, i.e., a recording and reproducing method, will be described.

(3) Description of Operation of Information Recording and Reproducing Apparatus (Information Recording and Reproducing Method)

The optical disk 1 illustrated in FIG. 1 is rotated at a constant angular velocity by a spindle motor 2. The optical pickup 3 has a well-known configuration and includes a laser diode, a photodetector, optical components and servo mechanism components. As a matter of fact, a linear motor for seek operation and so on are also added. Since they do not directly relate to the present invention, however, they are not illustrated. The output of the optical pickup 3 is amplified and separated into a prepit reproduction signal 15 and an optical magnetic reproduction signal 16 by the preamplifier 5. The prepit reproduction signal 15 is supplied to the succeeding A/D converter 6 and clock pit detection circuit 9. The optical magnetic reproduction signal 16 is supplied to the A/D converter 7. On the basis of the above described unique pattern of the prepit reproduction signal 15, the clock pit detection circuit 9 first discriminates the servo area and the data area, and then extracts the above described clock pit. The clock pit detection signal 17 is inputted to the servo clock generating circuit 10 and the data clock generating circuit 11. Clock generating is thus performed. The servo clock generating circuit 10 and the data clock generating circuit 11 are formed by a so-called phase-locked loop (PLL) and generate clocks synchronized in phase to the clock pits.

Figure 8:
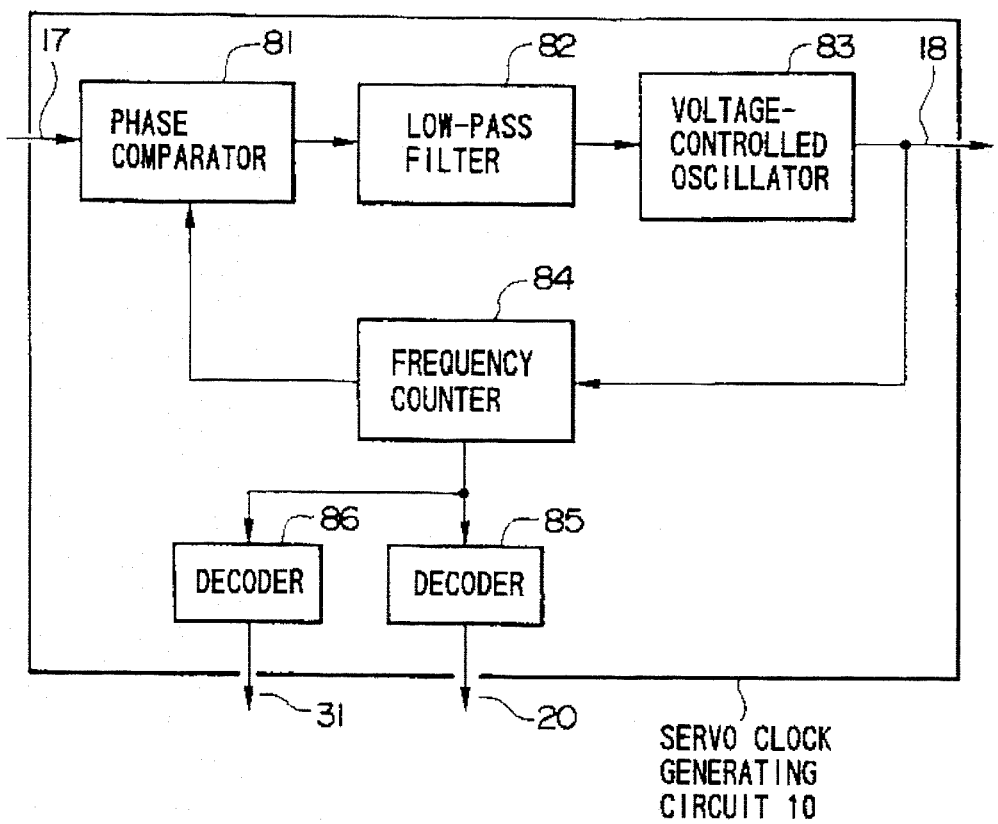
FIG. 8 is a second block configuration diagram of a circuit generating a servo clock for extracting the information of the servo areas.

As shown in FIG. 8, the servo clock generating circuit 10 is formed by a phase comparator 81, a low-pass filter 82, a voltage-controlled oscillator 83, and a frequency counter 84. The servo clock generating circuit 10 further includes a decoder 85, which generates a synchronizing pulse 20 for synchronization with the data clock generating circuit 11, and a decoder 86, which generates a timing signal 31 for detecting servo information. The sample servo format of the present example has a ratio of 8 bytes to 2 bytes as a ratio of data area to servo area. In this method, data of one byte are converted into 11 channel bits and recorded. Therefore, the frequency counter 84 is so set as to have a frequency counter divisor of 1/110. It is a matter of course that if a different format is used, the frequency counter divisor should be changed according to it. The servo clock 18 thus generated serves as a conversion clock of the A/D converter 6. The servo clock 18 is further used to extract servo information in the servo information detection circuit 8.

Figure 9:
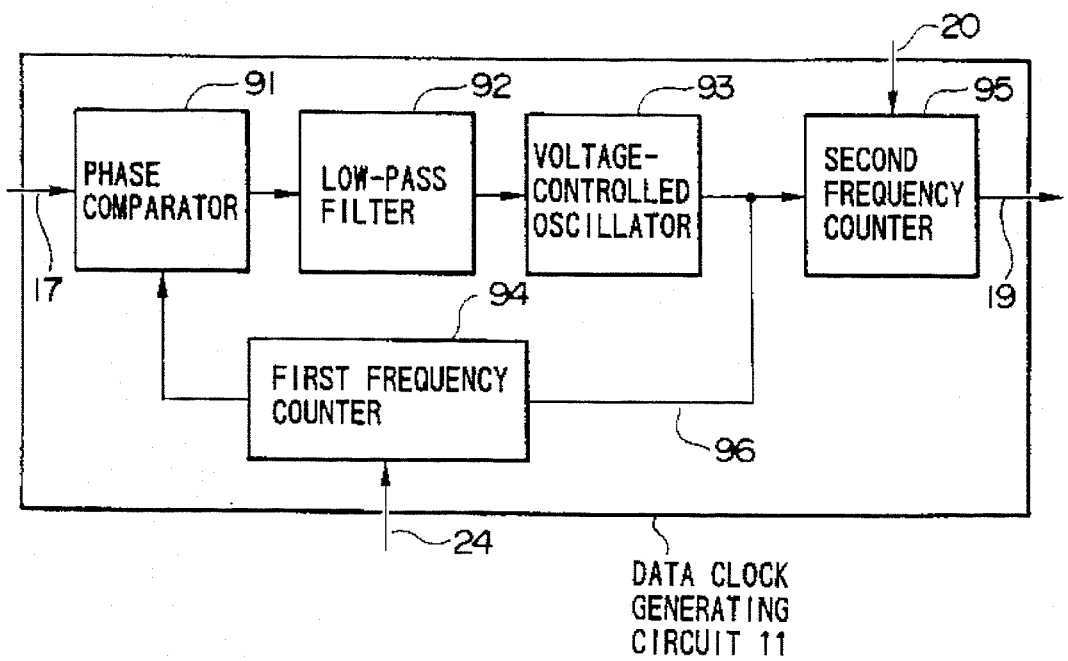
FIG. 9 is a third block configuration diagram of a circuit for generating a data clock which is used to extract information of the data area and has a period differing from band to band.

As shown in FIG. 9, the data clock generating circuit 11 also has a PLL circuit formed by a phase comparator 91, a low-pass filter 92, a voltage-controlled oscillator 93, and a first frequency counter 94. The data clock generating circuit 11 further includes a second frequency counter 95 for exercising frequency dividing of the output of the voltage-controlled oscillator 93 to generate the data clock 19. The second frequency counter 95 is reset by the above described synchronizing pulse 20 to be synchronized to the servo clock 18. From band to band of the disk, the frequency counter divisor of the first frequency counter 94 is switched by a switching signal 24 supplied from a controller which is not illustrated. Table 3 shows relations between bands and frequency counter divisors.

TABLE 3

Frequency counter divisor in first example of division

| Band | Data quantity (Byte) | First ratio | Second ratio | First ratio/second ratio |
|---|---|---|---|---|
| A | 8 | 440 | 4 | 110 |
| B | 9 | 495 | 4 | 123.75 |
| C | 10 | 550 | 4 | 137.5 |
| D | 11 | 605 | 4 | 151.25 |
| E | 12 | 660 | 4 | 165 |
| F | 13 | 715 | 4 | 178.75 |

Figure 10:
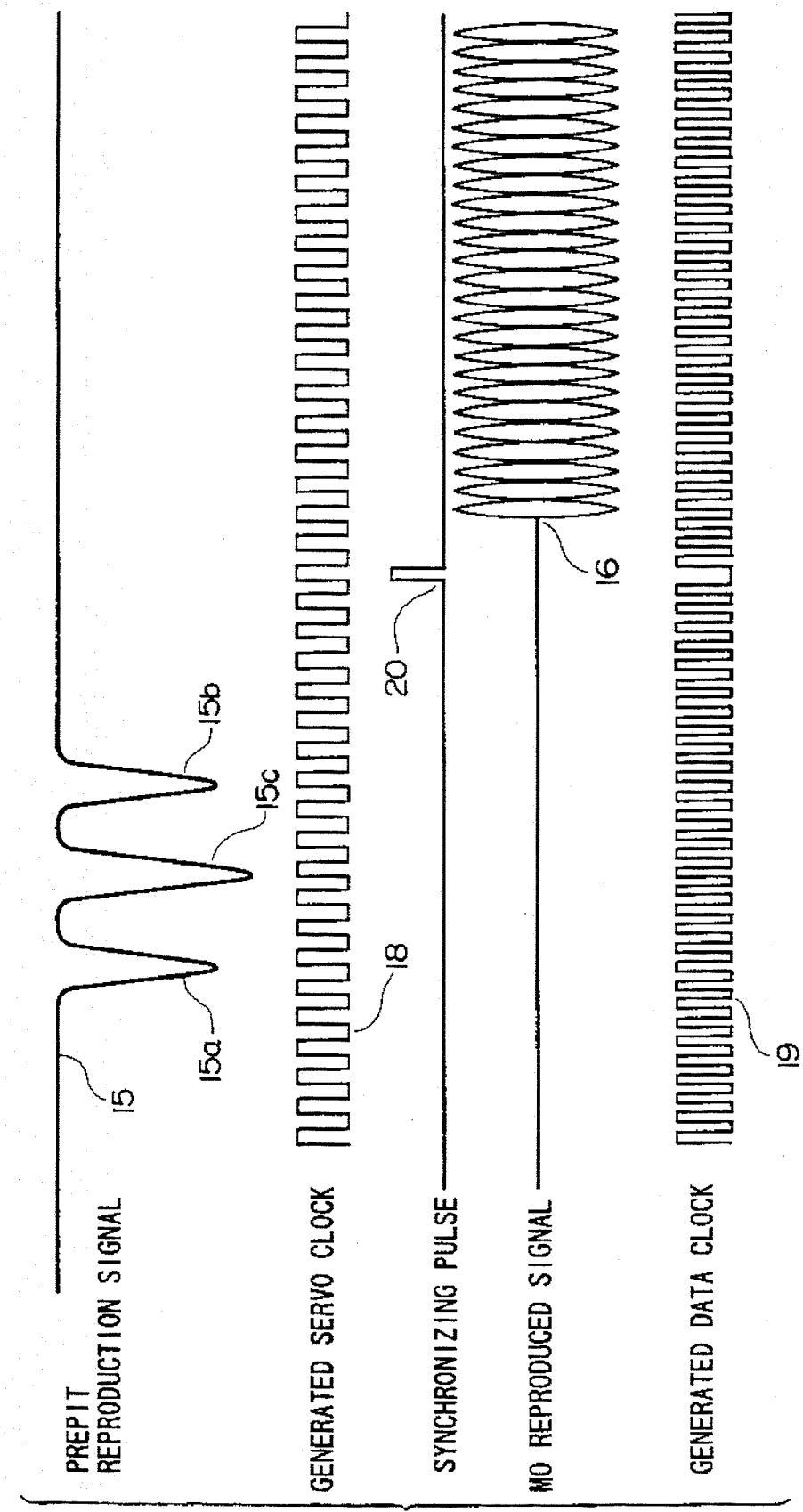
FIG. 10 is a clock-synchronized timing chart used to explain the operation for phasing the data clock by using a signal generated by means of the servo clock.

By taking 8 bytes as a standard, the length of the data area on the disk 1 becomes 1.125 times for 9 bytes, 1.25 times for 10 bytes, . . . , 1.625 times for 13 bytes. Therefore, it is necessary to raise the frequency of the clock as well in the same way. Since the frequency counter divisor of the PLL must be an integer, however, values such as 123.75, 137.5, . . . , 178.75 cannot be used. By generating a clock having a frequency which is four times as large as the original frequency as shown in FIG. 9, all frequency counter divisors become integers and hence the PLL can be formed. However, the phase of the data clock after frequency division with a ratio of 4 to 1 at the head of the data area does not become constant. Therefore, phasing is performed by means of the synchronizing pulse 20 generated by the above described servo clock generating circuit 10. FIG. 10 shows a timing chart of this operation (timing chart of clock synchronizing timing).

Every first frequency counter divisor shown in Table 3 includes 11 as its factor. This indicates that in a case where the recording modulation code is not the code of the present example in which one byte is converted to 11 channel bits, such as in a case where one byte is recorded as 8 channel bits, the present invention can be applied by changing the frequency counter divisor from 11 to 8 on the basis of a similar way of thinking.

For a disk having the configuration shown in Table 2, the frequency counter divisor in the servo clock generating circuit 10 is similarly set at 198 and the frequency counter divisor in the data clock generating circuit 11 is set at a value shown in Table 4. That is to say, the ratio of data area to servo area is 16 bytes to 2 bytes, and one byte is converted to 11 channel bits and recorded in this method. Therefore, the frequency counter 84 is so set as to have a frequency counter divisor of 1/198.

TABLE 4

Frequency counter divisor in second example of division

| Band | Data quantity (Byte) | First ratio | Second ratio | First ratio/second ratio |
|---|---|---|---|---|
| A | 16 | 1584 | 8 | 198 |
| B | 17 | 1683 | 8 | 210.75 |
| C | 18 | 1782 | 8 | 222.75 |
| D | 19 | 1881 | 8 | 235.125 |
| E | 20 | 1980 | 8 | 247.5 |
| F | 21 | 2079 | 8 | 259.875 |
| G | 22 | 2178 | 8 | 272.25 |
| H | 23 | 2277 | 8 | 284.625 |
| I | 24 | 2376 | 8 | 297 |
| J | 25 | 2475 | 8 | 309.375 |
| K | 26 | 2574 | 8 | 321.75 |

<Embodiment 2>

Figure 11:
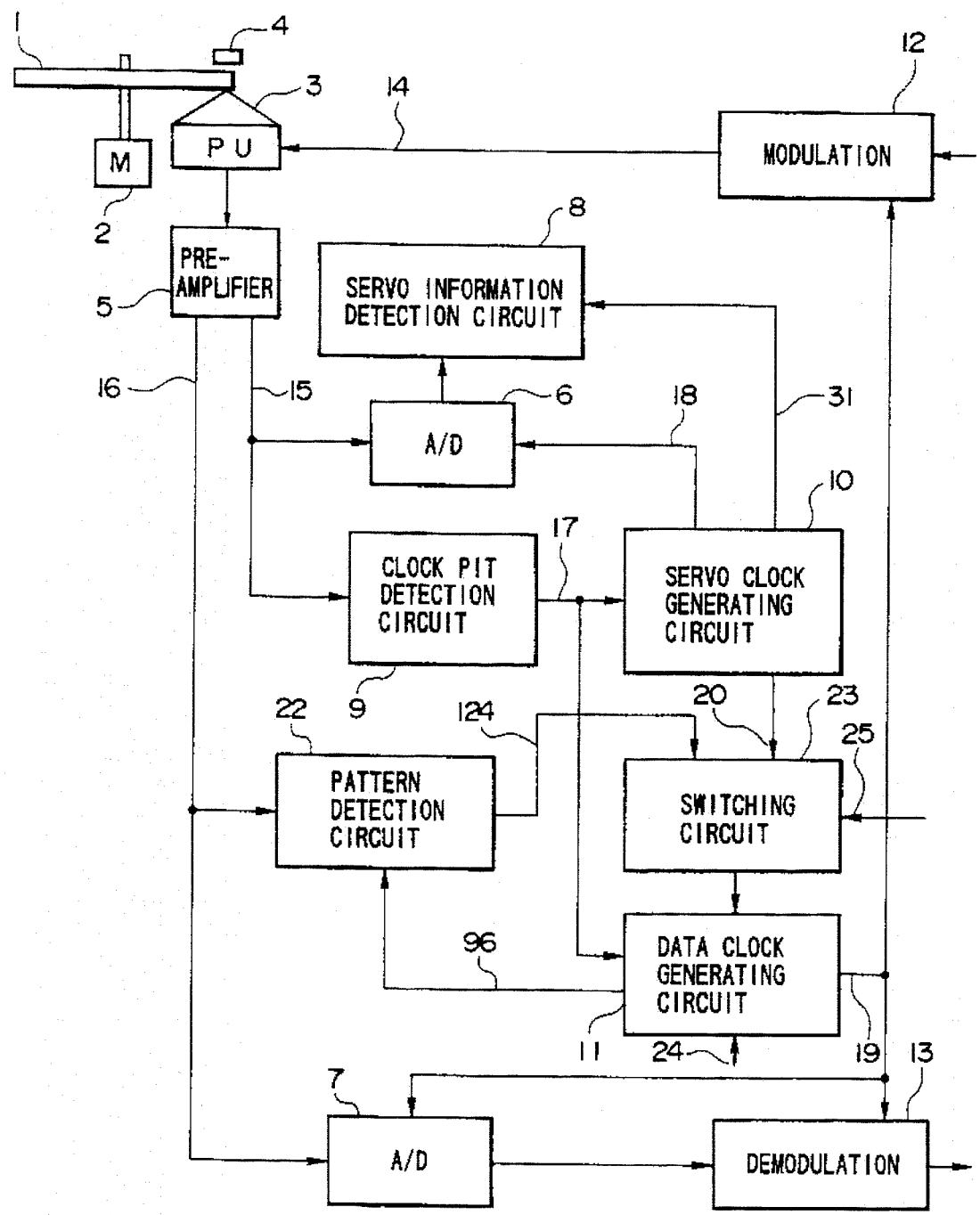
FIG. 11 is a fourth block configuration diagram of an information recording and reproducing apparatus which phases the data clock by using a specific pattern recorded at the head of user data.

As another example of an information recording and reproducing apparatus, the block diagram of an apparatus for performing phasing of the above described data clock by using a specific pattern included in recorded data is shown in FIG. 11. In FIG. 11, the present invention has been applied to an optical magnetic disk drive apparatus in the same way as FIG. 1. The same components are denoted by like numerals. In FIG. 11, a pattern detection circuit 22 and a switching circuit 23 are newly added. This pattern detection circuit 22 detects a specific pattern out of the reproduction signal. The second frequency counter 95 included in the data clock generating circuit 11 of FIG. 9 is reset by this detection signal. This specific pattern is recorded at the head of user data of the sector simultaneously with data recording.

Figure 12:
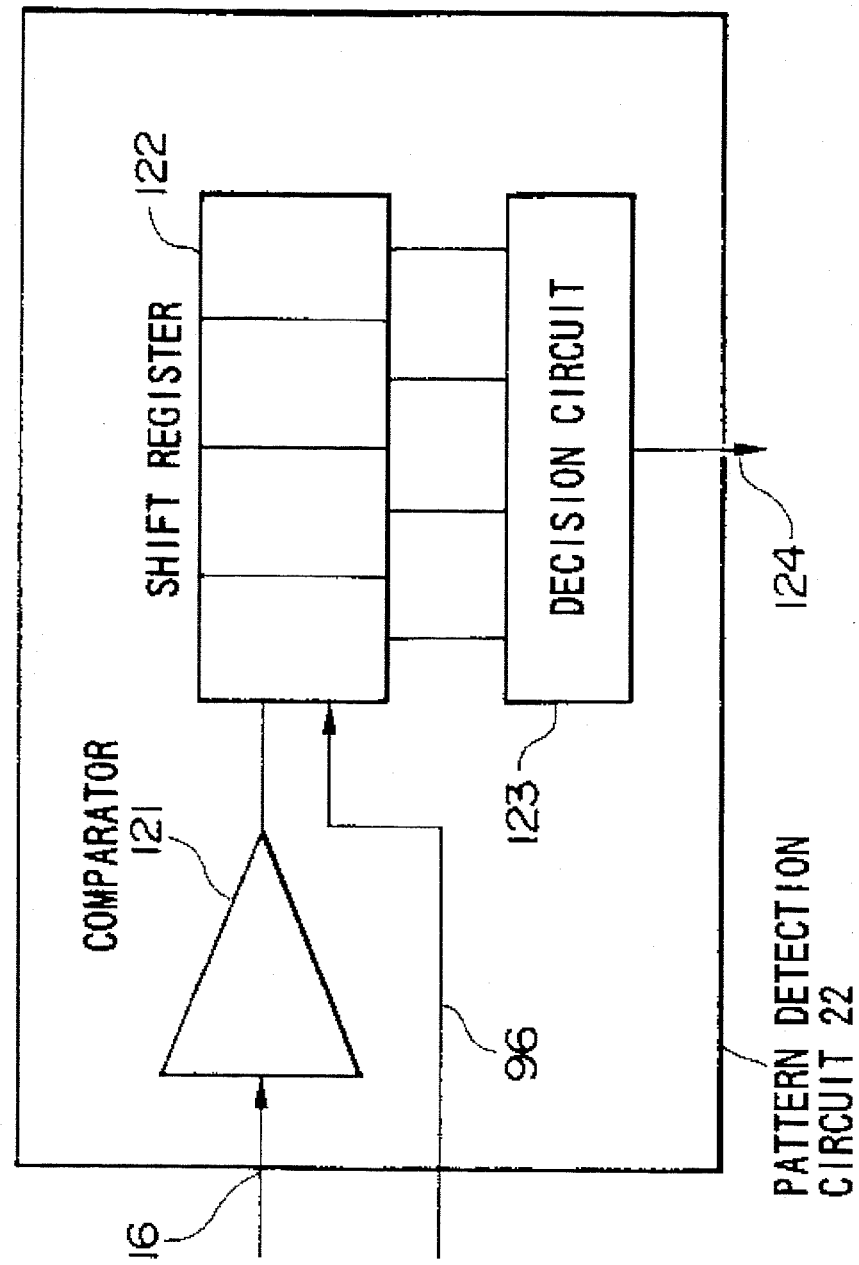
FIG. 12 is a fifth block configuration diagram of a circuit for detecting the specific pattern.
Figure 13:
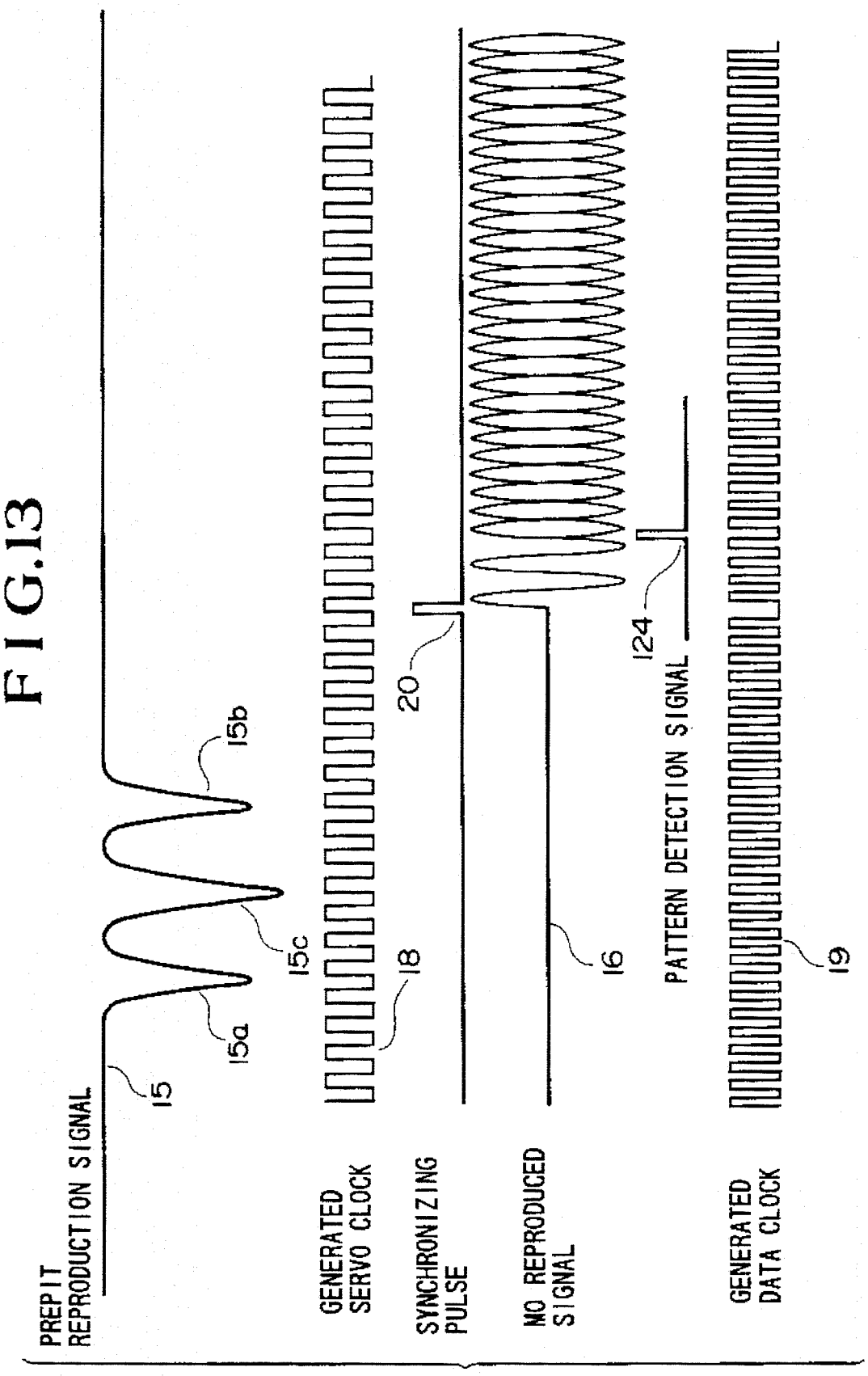
FIG. 13 is a clock-synchronized timing chart used to explain the operation for phasing the data clock by using the specific pattern recorded at the head of user data.

FIG. 12 shows an example of the pattern detection circuit. The reproduction signal 16 is subjected to binarization in a comparator 121 and sampled into a shift register 122 by a clock 96 outputted from a VCO (voltage-controlled oscillator) included in the data clock generating circuit 11, i.e., a clock having a frequency which is four times as large as the frequency of the channel bit clock. The signal thus sampled undergoes pattern detection in a decision circuit 123. A resultant pattern detection signal 124 resets the second frequency counter 95 included in the second clock generating circuit. Thereby, phase synchronization between reproduction data and clock is performed as shown in FIG. 13. That is to say, FIG. 13 shows a timing chart of clock synchronizing timing. In accordance with a selection signal supplied from a controller (not illustrated), the switching circuit 23 of FIG. 11 selects the synchronizing pulse 20 supplied from the servo clock generating circuit 10 or the pattern detection signal 124 supplied from the pattern detection circuit 22. The signal thus selected is supplied to the data clock generating circuit 11. Only when data already recorded is to be read is the pattern detection signal 124 selected. In other states, the synchronizing pulse 20 is selected.

<Embodiment 3>

An example of an information recording and reproducing apparatus corresponding to the recording medium described by referring to FIG. 7 is shown in a block diagram of FIG.

Figure 14:
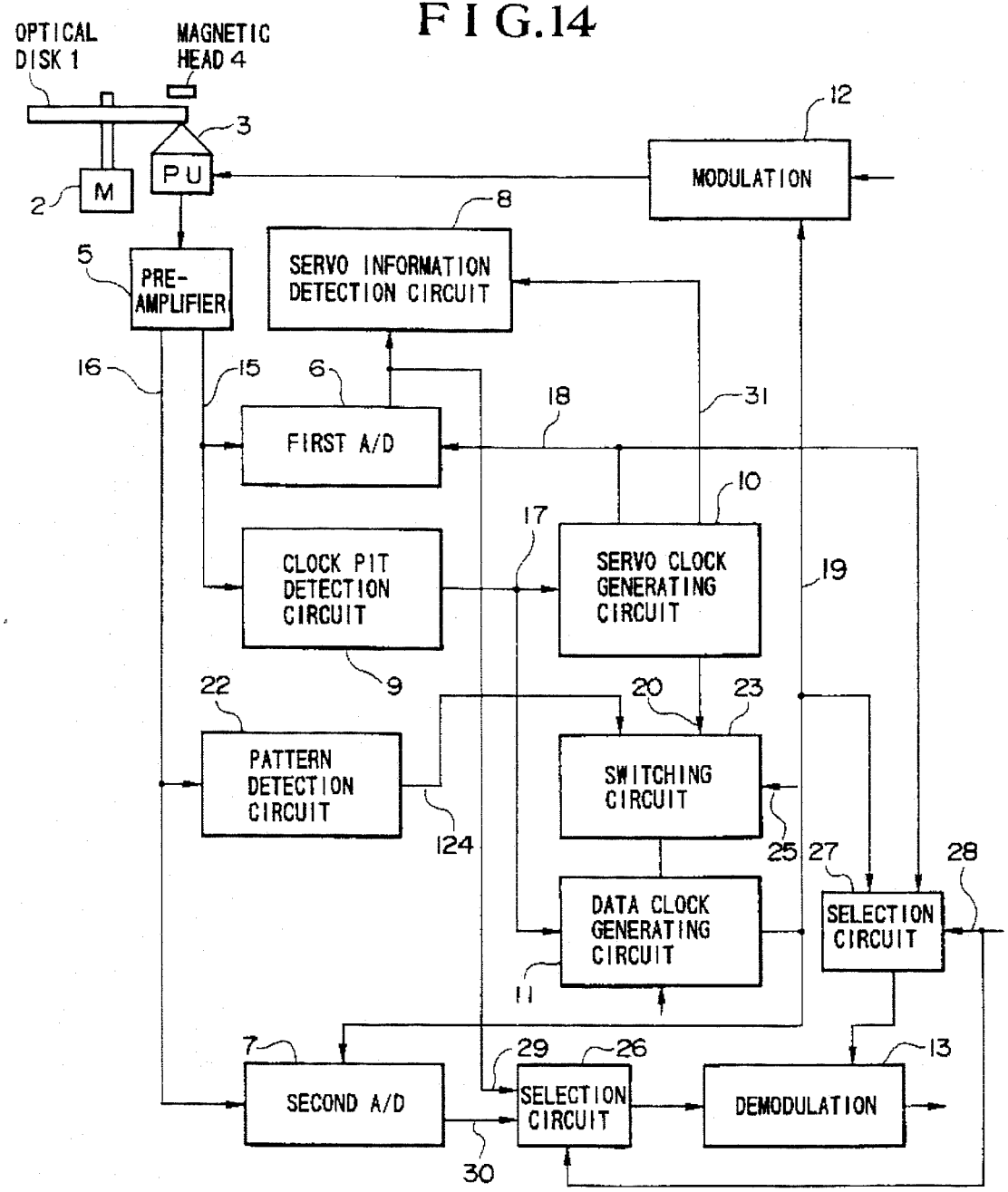
FIG. 14 is a block configuration diagram of an information recording and reproducing apparatus handling a disk having ID sections preformatted with the same density as that of the servo areas.

14. Description will now be given by referring to FIG. 14. In FIG. 14, an output 29 of the first A/D converter 6 or an output 30 of the second A/D converter 7 is selected and supplied to the demodulation circuit 13 as input data by a selection circuit 26. As for the clock used in the demodulation circuit 13, the servo clock 18 or the data clock 19 is selected by a selection circuit 27 and supplied to the demodulation circuit 13. The selection circuit 26 selects the first A/D converter 6 at the time of reproduction of ID information and selects the second A/D converter 7 at the time of reproduction of other data. The selection circuit 27 selects the servo clock 18 at the time of reproduction of ID information and selects the data clock 19 at the time of reproduction of other data. Both selection circuits 26 and 27 are controlled by a selection signal 28 supplied from a controller (not illustrated).

<Embodiment 4>

A format of a medium facilitating phasing of the servo clock to the data clock and an information recording and reproducing method and an information recording and reproducing apparatus using this medium will now be described.

Figure 15:
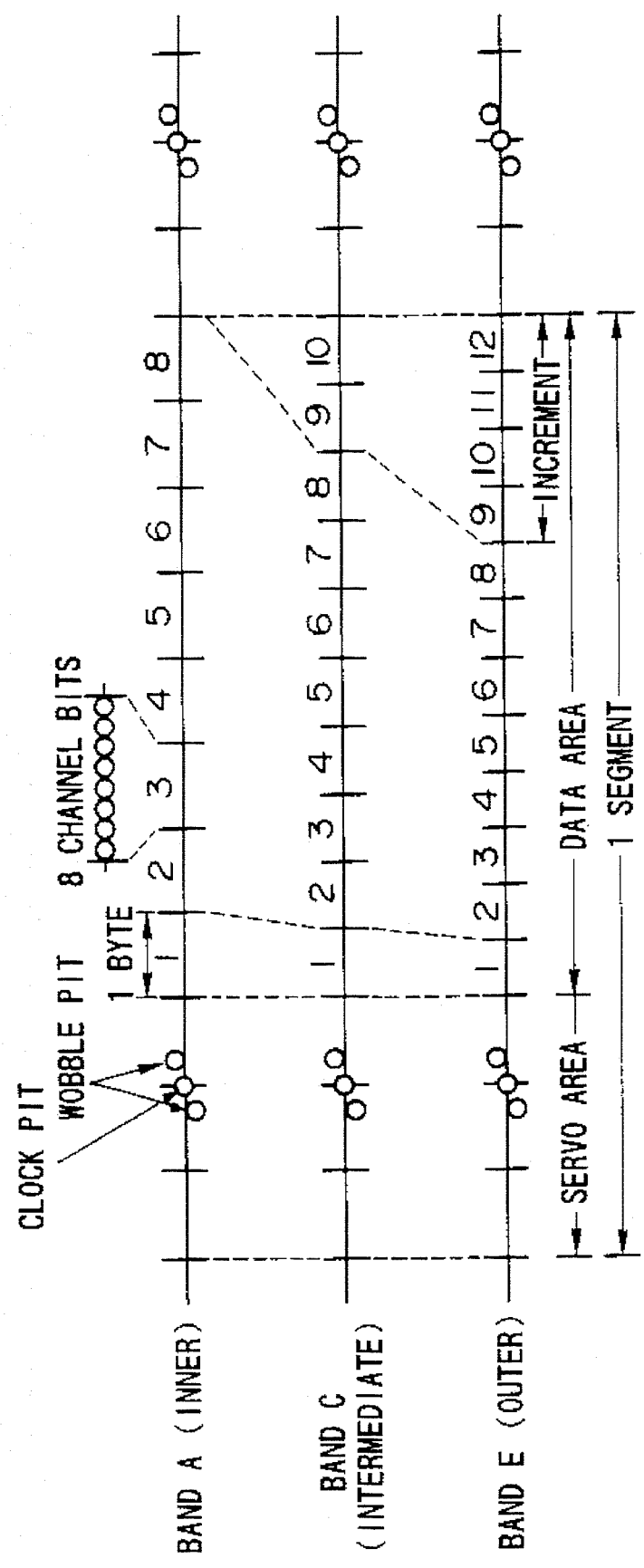
FIG. 15 shows a first example of a segment configuration according to the present invention.

FIG. 15 shows a new example of a segment configuration of a recording medium. As shown in FIG. 16, this medium also takes the shape of a disk in the same way as the above described examples. The medium is divided into a plurality of bands in the radial direction and rotated at a constant angular velocity. The disk face is divided into five bands A to E. In the innermost band A, each segment is divided into 11 equal parts to form a servo area occupying 3 bytes and a data area occupying 8 bytes. Servo areas are arranged in the radial direction of the disk so as to form a straight line. Therefore, the further out the segment is located, the longer the segment length becomes and the more data can be recorded. In any band, however, the temporal lengths of the servo area and the data area are constant and proportions of them to the segment length on the disk are always constant. Positions of clock pits also form a straight line in the radial direction of the disk. By using the clock pit as a reference signal of clock generation, servo clocks dividing the space between clock pits, i.e., one segment, into integer equal parts are generated. Detection of servo information such as detection of wobble pits is performed. According and reproducing operation of the data area is also conducted with the data clock generated by using the clock pit as a standard. In the innermost band A, this data clock has the same frequency as that of the servo clock. However, the further out the band is located, the higher the frequency of the data clock becomes. In the example of FIG. 15, the recording method is decided to be NRZ (Non Return to Zero). Therefore, the number of channel bits is equal to the number of data bits, and it is 8 bits per byte. Therefore, the frequency counter divisor between the clock pit period and the servo clock period is 8×11=88. The frequency counter divisor between the clock pit period and the data clock period in the innermost band is also 8×11=88. As for the frequency counter divisor between the clock pit period and the data clock period in any other band, a positive integer dividing the data area into equal parts and dividing the servo area into equal parts is selected. Assuming now that the number of bytes recorded in the data area is 9 bytes in the band B adjacent to the innermost band (band A) of FIG. 16, 72 is used as the number of clocks of the data clock. Since the length of the servo area is ⅜ of that of the data area, 27 clocks are used. In the band B, therefore, the frequency counter divisor of the data clock becomes 99.

By similar way of thinking, data of 10 bytes are recorded and the frequency counter divisor becomes 110 in the band C. In the band D, data of 11 bytes are recorded and the frequency counter divisor becomes 121. In the outermost band E, data of 12 bytes are recorded and the frequency counter divisor becomes 132. In any band, the data area and the servo area are divided into equal parts by the data clock. In addition, the number of clocks in the data area is an integer times the number of channel bits per byte. In the boundary portion between the data area and the servo area, therefore, the phase of the servo clock coincides with the phase of the data clock. For the CAV method, it is now assumed that the number of bytes of the servo area is $B_S$ and the number of bytes of the data area is $B_D$. For the MCAV method, it is now assumed that the number of bytes of the data area differing from band to band is $B_M$ and the number of channel bits is $b_c$. Then the frequency counter divisor N is represented by the following equation.

$$N=[(B_D+B_S)/B_D]\cdot B_M\cdot b_c \qquad (1)$$

By deciding the frequency counter divisor N of the data clock so as to be the product of the reciprocal of the proportion of the data area length to the segment length, the number of bytes of the data area, and the number of channel bits and to be an integer, the phase of the data clock in the area boundary portion can be made constant. The number of data bytes BM increases or decreases from band to band while taking one byte as the minimum unit. The number of channel bits $b_c$ is decided by the recording modulation method. Both of them are integers. The proportion of the data area length to the segment length is represented by a value in the state in which the servo clock coincides with the data clock, i.e., a value obtained by dividing the number of bytes of the data area in the CAV method by the number of bytes of one segment. The number of data bytes $B_D$ and the number of servo bytes $B_S$ in the CAV method are also integers. If it is attempted to make the reciprocal of the proportion of the data area length to the segment length an integer in order to make the frequency counter divisor an integer, the proportion of the servo area length to the segment length becomes large and the recording capacity is decreased. As an optimum method, setting is so made that a value obtained by dividing the product of the number of channel bits $b_c$ per byte and the total number of bytes $(B_D+B_S)$ in the CAV method by the number of data bytes $B_D$ of the data area in the CAV method may become an integer. Alternatively, setting is so made that a value obtained by dividing the number of channel bits $b_c$ by the number of data bytes $B_D$ in the CAV method may become an integer. Thereby, an optimum frequency counter divisor the data clock is realized in every band of the MCAV method. In the example of FIG. 15, the recording modulation method is NRZ and the number of channel bits is 8. Therefore, the above described condition is satisfied by setting 8 as the number of bytes of the data area in the innermost band A.

Figure 17:
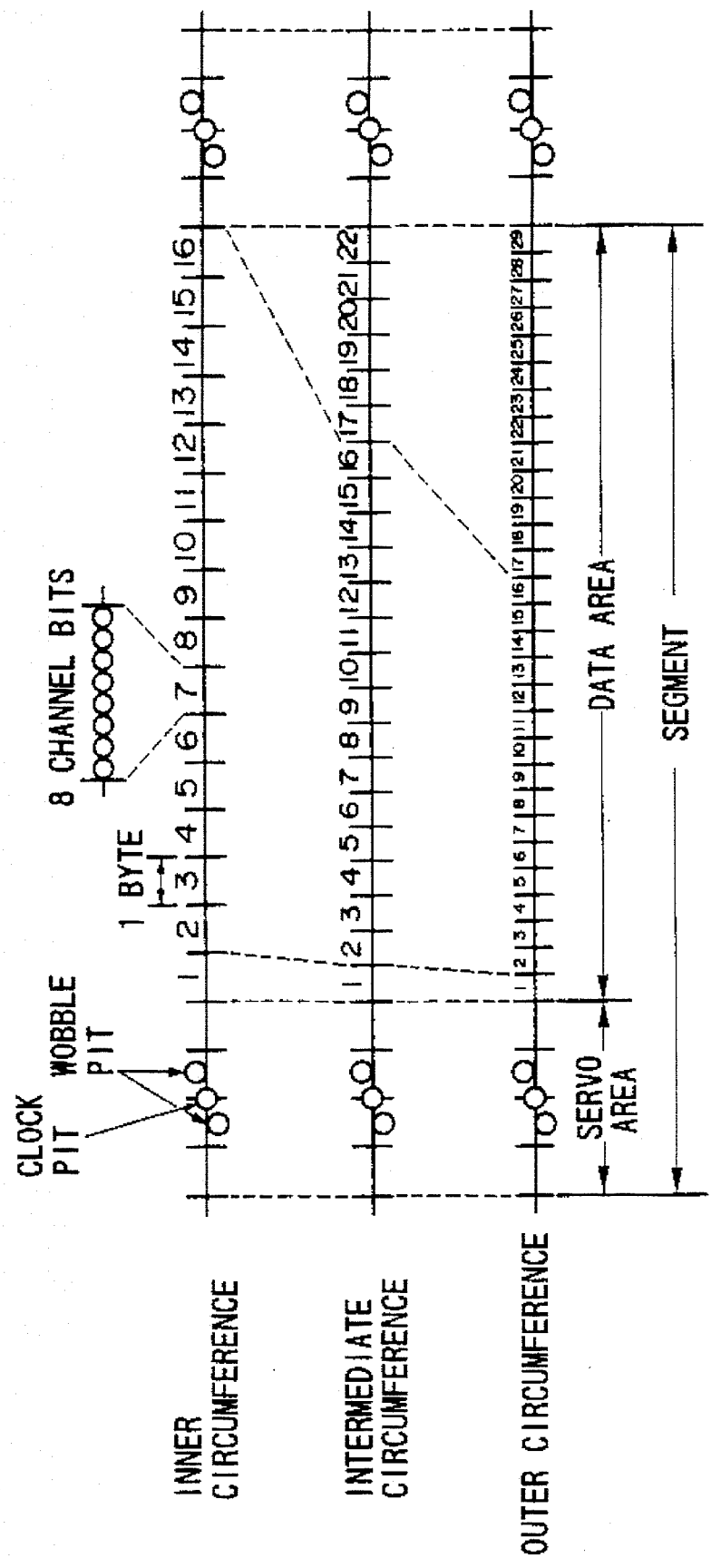
FIG. 17 shows a second example of a segment configuration according to the present invention.

FIG. 17 shows a new example of a formation the case where the number of channel bits is 8. In the innermost band, the data area occupies 16 bytes and the servo area occupies 4 bytes. The data area increases by one byte every adjacent band. The disk is divided into 14 bands. In the innermost band, i.e., in the CAV method, the total number of bytes in one segment is 20 and the number of data bytes is 16. Therefore, the value obtained by dividing the number of channel bits by the number of data bytes becomes 1 or less. However, the product of this value and the total number of bytes becomes an integer and the above described condition is satisfied. In any case, however, the phase of the servo clock coincides with the phase of the data clock at a timing of every two bytes of the servo clock. On the other hand, if the increment of the data area between adjacent bands is 2 bytes and the number of divisions is 7, an arbitrary number of bytes of the servo area can be set and the phase of the servo clock can coincide with the phase of the data clock every byte of the servo clock.

Figure 18:
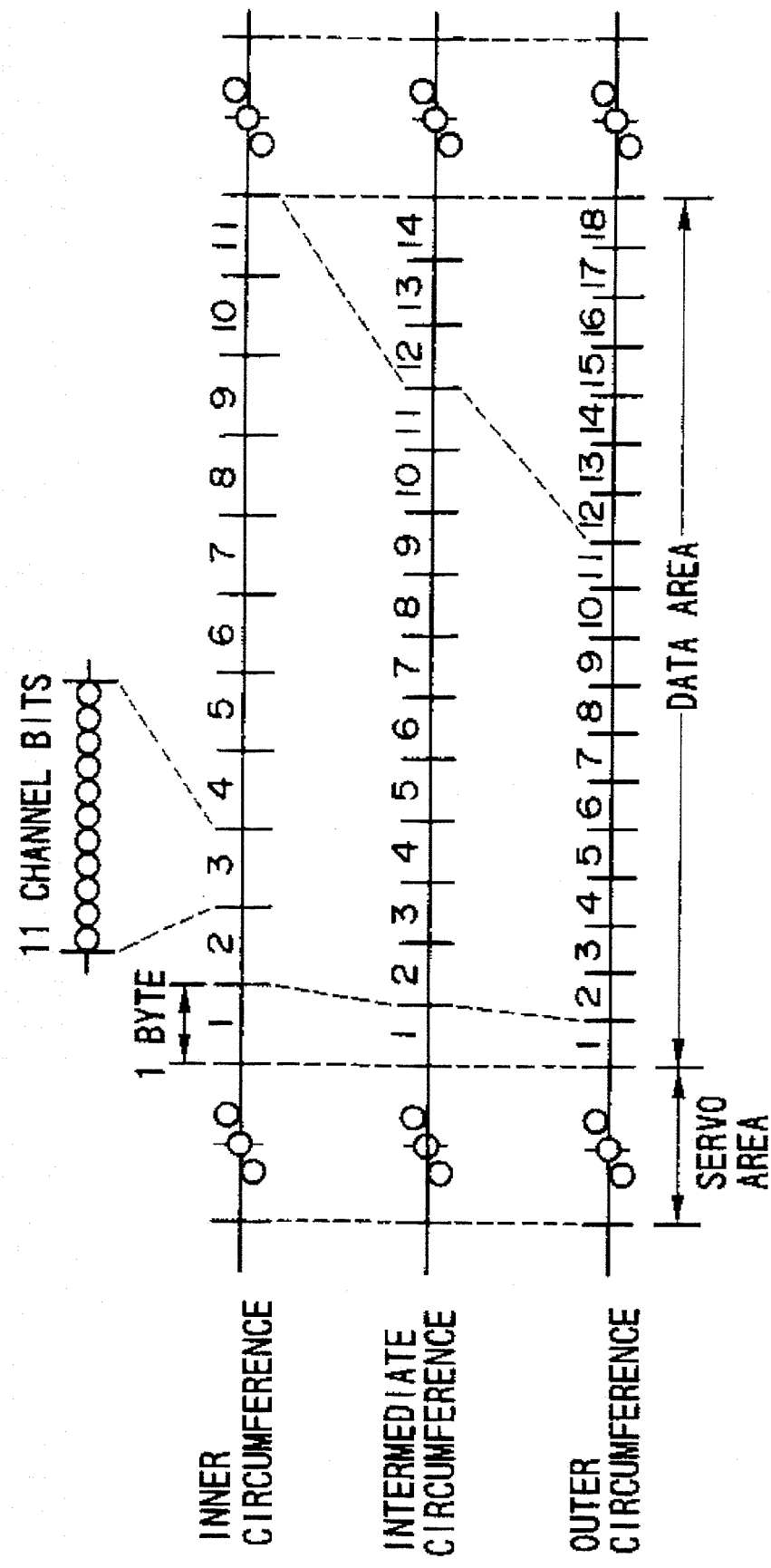
FIG. 18 shows a third example of a segment configuration according to the present invention.
Figure 19:
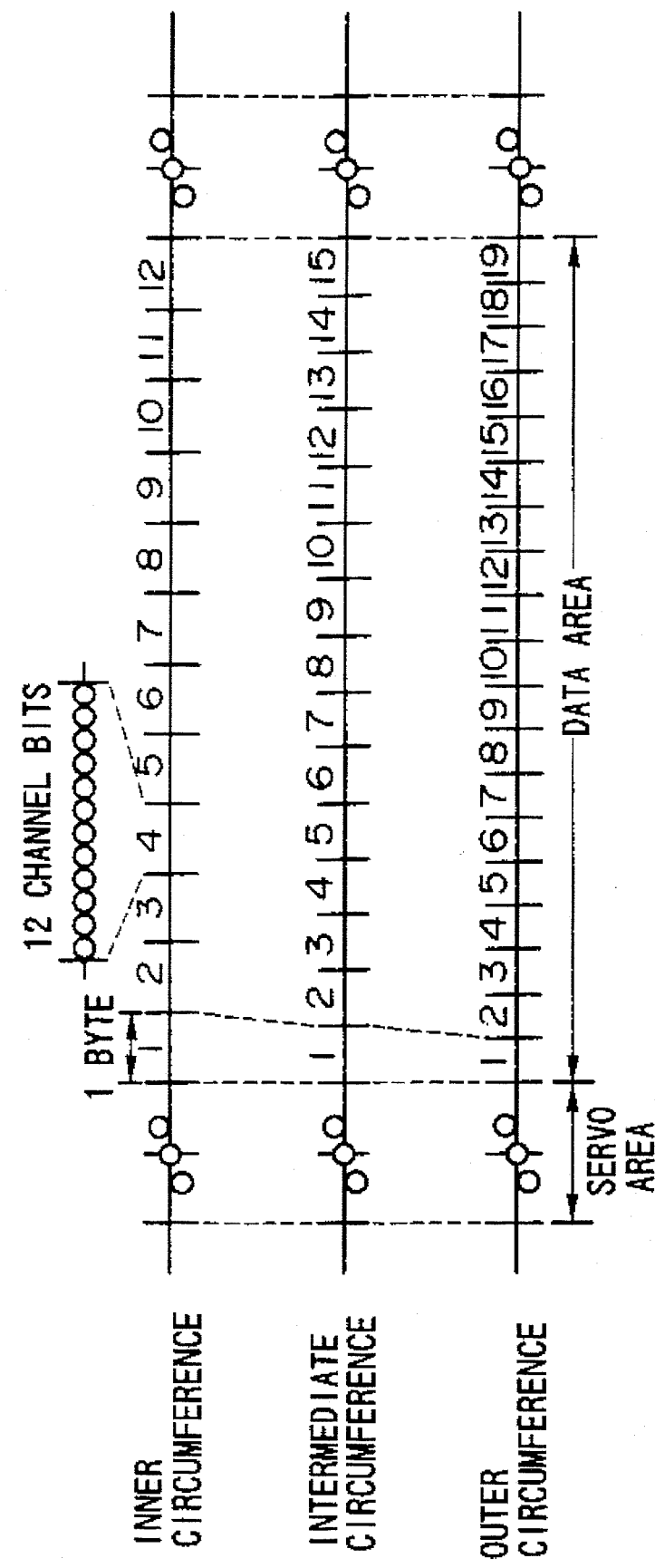
FIG. 19 shows a fourth example of a segment configuration according to the present invention.

Another example of a segment configuration is shown in FIG. 18. In this case, a recording modulation method with each byte having 11 channel bits is adopted and the disk face is divided into a plurality of bands in the radial direction. In the same way as, the example of FIG. 15, the servo clock for performing reproduction of the servo area in the innermost band coincides with the data clock for performing recording and reproduction of the data area. The number of data bytes in the innermost band is set at 11. Even if the number of data bytes is set at an arbitrary integer exceeding 11 in other bands, therefore, the frequency counter divisor becomes an integer. Such a data format that the phase of the data clock in the boundary portion is constant in every band is realized. Although the number of bytes in the servo area is set at 2, this value is arbitrary. Since the number 11 of channel bits included in each channel is a prime number, a value smaller than this cannot be used as the number of data bytes in the innermost circumference. However, the number of data bytes in the innermost circumference can be set at 22 which is twice 11. In this case, however, the sum of the number of servo bytes and the number of data bytes of the CAV method must be made a multiple of 2. Alternatively, the number of data bytes in other bands must be made such a value that a remainder is not generated when it is divided by 2. In the same way, in a case where the number of data bytes in the innermost band is set at 33 which is three times 11, the sum of the number of servo bytes and the number of data bytes in the CAV method must be made equal to a multiple of 3. Alternatively, the number of data bytes in other bands must be made such a value that a remainder is not generated when it is divided by 3. FIG. 19 shows an example in which a recording modulation method with each byte having 12 channel bits is adopted. This corresponds to a recording modulation method known as (1, 7) RLL code. In this example as well, the servo clock for performing reproduction of the servo area in the innermost band have the same period as that of the data clock for performing recording and reproduction of the data area in the same way as the above described two examples. The present invention is not limited to the byte length of the servo area of 2 bytes shown in FIG. 19, either. If the number of bytes of the data area in the innermost band is set at 12 bytes and the number of bytes of the servo area is set at 3 bytes, the frequency counter divisor of the servo clock and the data clock in the innermost band becomes 180. In the outer band adjacent to the innermost band, the frequency counter divisor becomes 195 by making the number of bytes of the data area equivalent to 13. In the intermediate circumference shown in FIG. 19, the frequency counter divisor becomes 225 by making the number of bytes of the data area equivalent to 15. In the outer circumference, the frequency counter divisor becomes 285 by making the number of bytes of the data area equivalent to 19. In any case, the frequency counter divisor becomes an integer. By thus setting the number of bytes of the data area in the innermost band at 12, the frequency counter divisor becomes an integer when the number of bytes of the data area in other bands is an arbitrary integer exceeding 12. Therefore, an arbitrary number of bytes can be set. Further, in this recording modulation method, the number of bytes of the data area in other bands can be set at an arbitrary integer value in the same way as the above described example by setting the number of bytes of the data area of the innermost band at 6 bytes.

Any of the examples heretofore described has been realized by satisfying the condition that the ratio between the number of channel bits per byte and the number of bytes of the data area in the state that the servo clock coincides with the data clock should be an integer. Therefore, it is evident that the present invention is effective even in a case of a recording modulation method other than the foregoing one, i.e., even in a case where the number of channel bits per byte is different from that of the examples heretofore described. Further, a value other than the number of bytes of the data area described before as examples is realized while bringing about a similar effect so long as the above described condition is satisfied.

Figure 20:
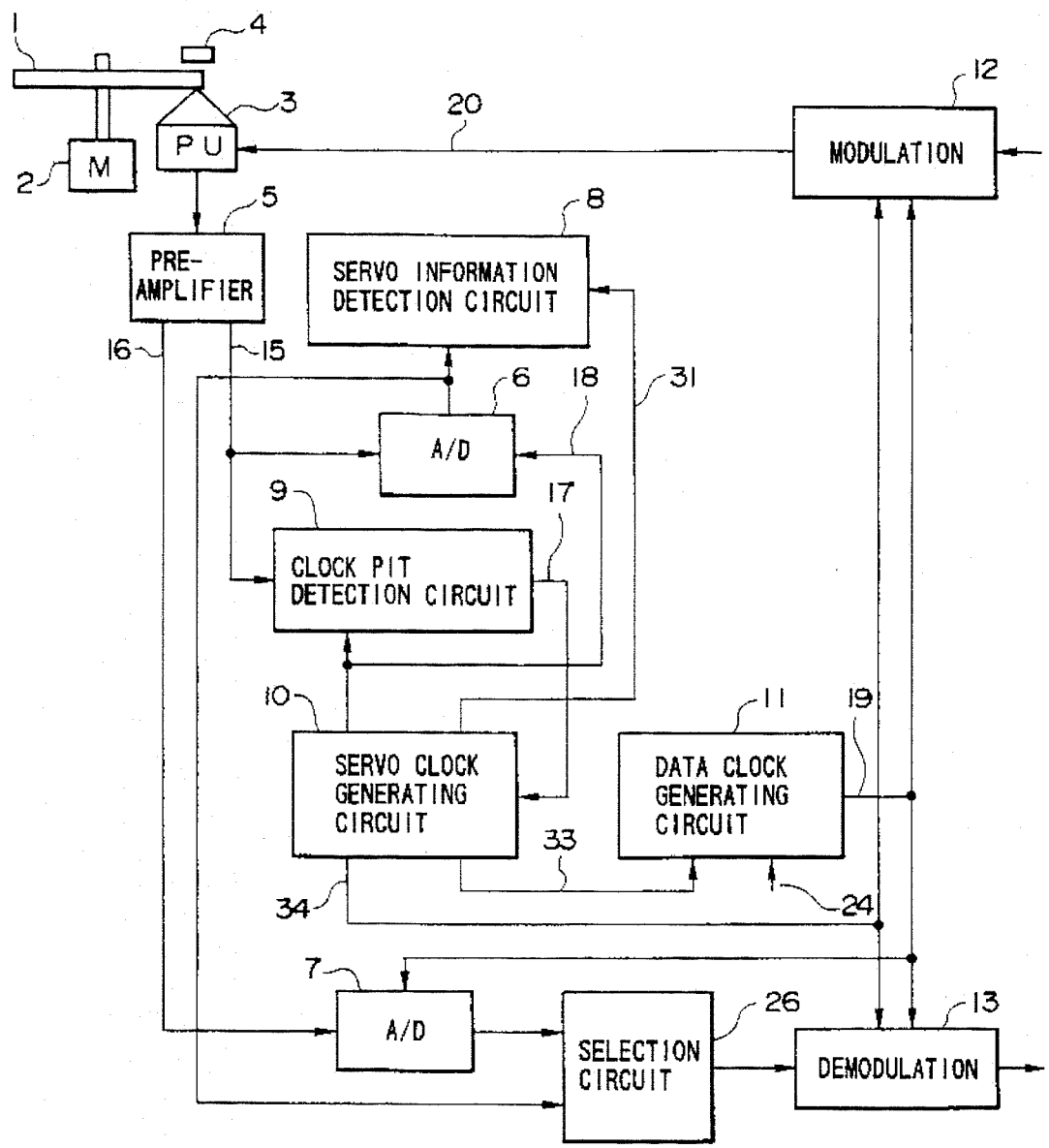
FIG. 20 is a sixth block configuration diagram of an information recording and reproducing apparatus according to the present invention.
Figure 21:
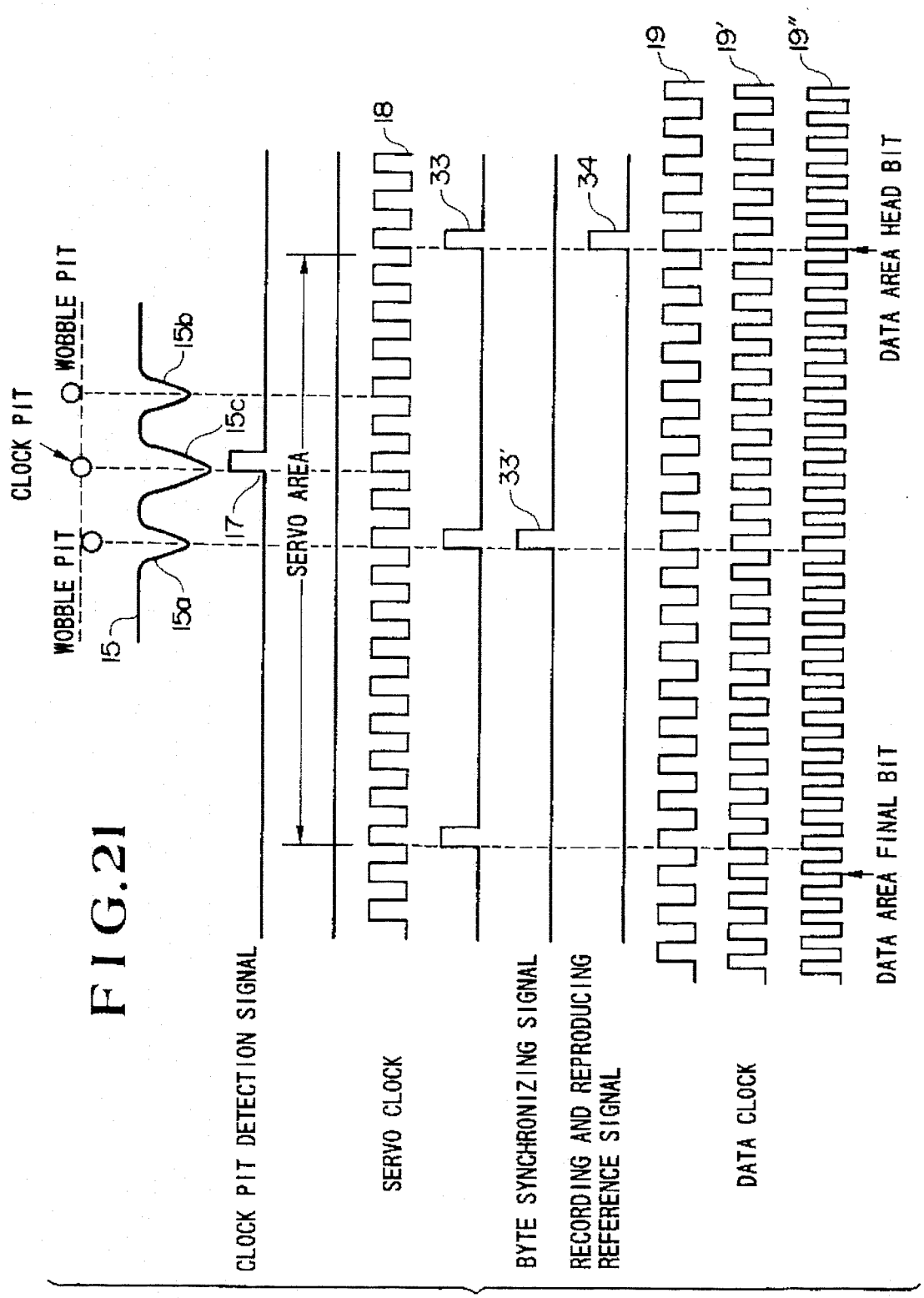
FIG. 21 is a timing chart for explaining the operation of the sixth block configuration diagram of an information recording and reproducing apparatus according to the present invention.
Figure 22:
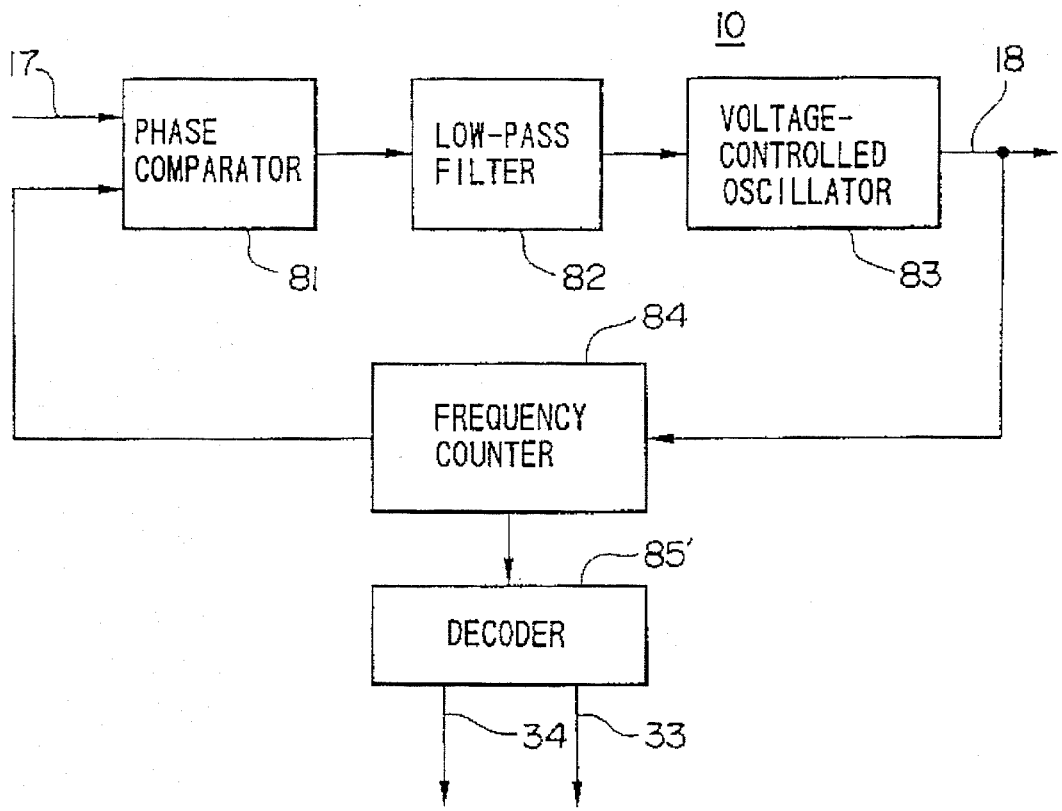
FIG. 22 shows an example of a configuration of a servo clock generating circuit.

Examples of a configuration of an information recording and reproducing apparatus will now be described. FIG. 20 shows an example of a block configuration. Components having the same functions as those of FIGS. 1, 11 and 14 are denoted by like numerals and description of them will be omitted. It is here assumed that the prepit signals include the servo signal of the servo area and ID information of each sector, and the ID information and servo information are always recorded by the same clock as that of the servo signal. In case the ID information is recorded and reproduced by the same clock as the optical magnetic signal, however, it is possible to use such a configuration that the prepit signal 15 and the optical magnetic signal 16 are switched to be selectively inputted to the second A/D converter 7. Further, it is possible to employ such a configuration that only a single A/D converter is used and the input clock and conversion clock are appropriately switched. Detection of the servo information is performed in the servo information detection circuit 8 by the servo clock 18 synchronized to the clock pit detection signal 17 as shown in FIG. 21. Generation of the servo clock 18 is performed by the servo clock generating circuit 10. FIG. 22 shows an example of the servo clock generating circuit. A PLL similar to that of FIG. 8 is shown in FIG. 22. Components having the same functions as those of FIG. 8 are denoted by like numerals. A decoder 85' generates a byte synchronizing signal 33 on the basis of the output of the frequency counter 84 and outputs the byte synchronizing signal 33 at a fixed position between segments. The byte synchronizing signal 33 is a signal functioning as a standard in data clock generation which will be described later. At the rising edge or falling edge of this signal, the phase of the servo clock 18 coincides with the phase of the data clock 19. By performing the band division and segment configuration under the above described condition, a signal obtained by extracting the servo clock 18 at intervals of one byte becomes the byte synchronizing signal 33. Further, it is not always necessary to use all of the signals obtained by extracting the servo clock 18 at intervals of one byte. Subject to the condition that each segment is divided into equal parts, a signal extracted at intervals of an arbitrary number of bytes can be used. Its minimum value is 1. That is to say, a byte synchronizing signal 33' which appears at a rate of one per segment can be used.

Figure 23:
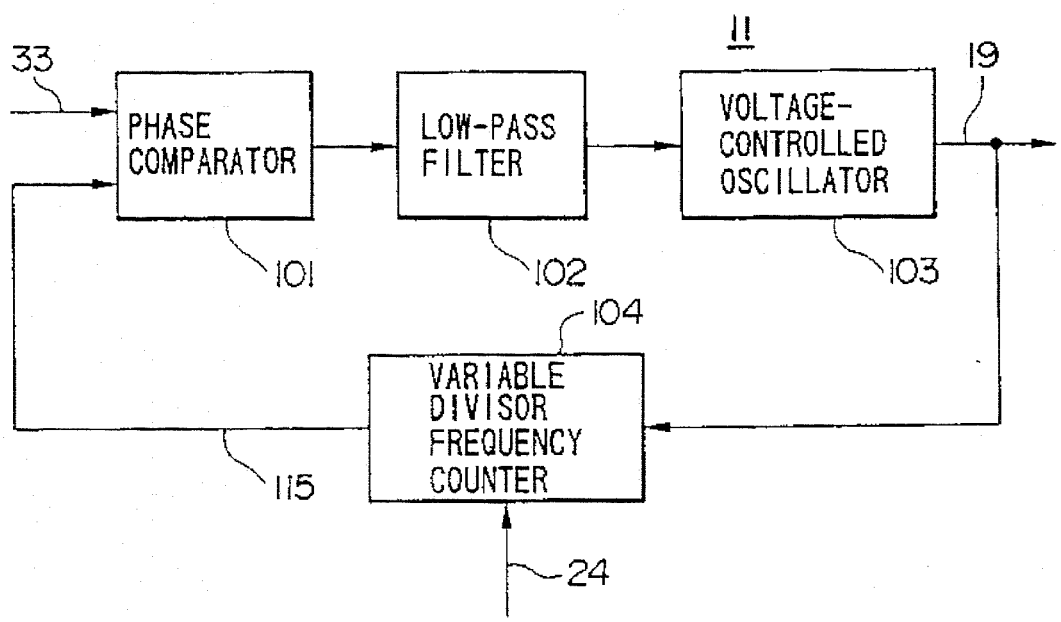
FIG. 23 shows an example of a configuration of a data clock generating circuit.

FIG. 23 shows an example of a configuration of the data clock generating circuit 11. In the same way as in FIG. 22, this example also has the configuration of a PLL. Numeral 101 denotes a phase comparator, 102 a low-pass filter, 103 a voltage-controlled oscillator, and 104 a frequency counter. The frequency counter 104 is a variable divisor frequency counter having a frequency counter divisor which is changed by the control signal 24 supplied from a controller (not illustrated). The frequency counter divisor is changed from band to band, and a data clock 19 having a different frequency is outputted. As shown in FIG. 21, however, the clock having any frequency is synchronized in phase to the byte synchronizing signal 33 functioning as the reference signal.

At the same time, the byte synchronizing signal 33 functions as a reference signal at the time of recording and reproduction. As shown in FIG. 21, the head bit position of the data area in every band coincides in phase with one signal of the byte synchronizing signal 33 generated repetitively in one segment. By extracting this byte synchronizing signal located at the head of the data area, therefore, the recording and reproducing reference signal 34 common to all bands is obtained. To be specific, the decoder 85' in the example of the servo clock generating circuit shown in FIG. 22 generates the recording and reproducing reference signal 34 on the basis of the output of the frequency counter 84.

Figure 24:
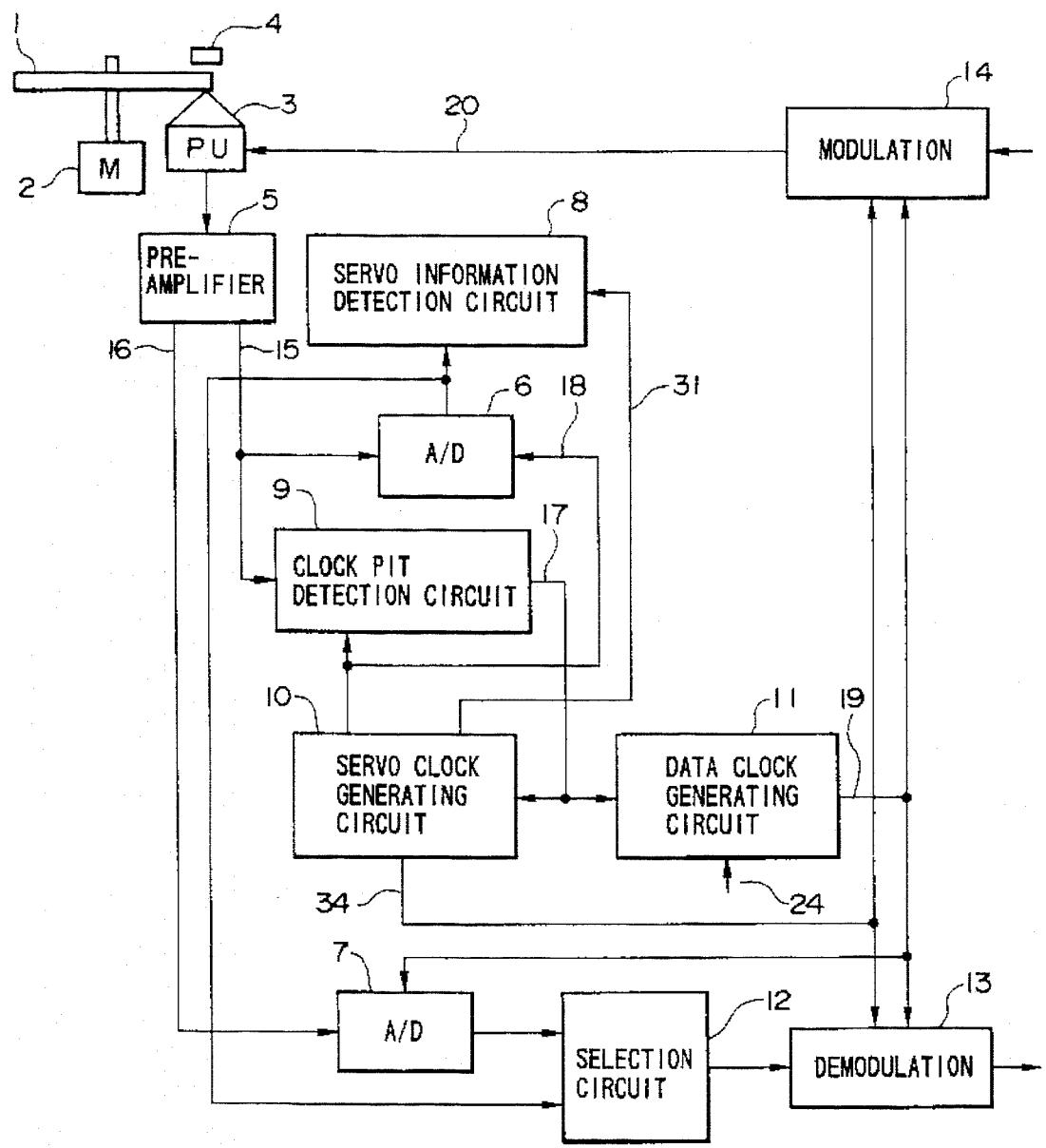
FIG. 24 is a seventh block configuration diagram of the information recording and reproducing apparatus according to the present invention.
Figure 25:
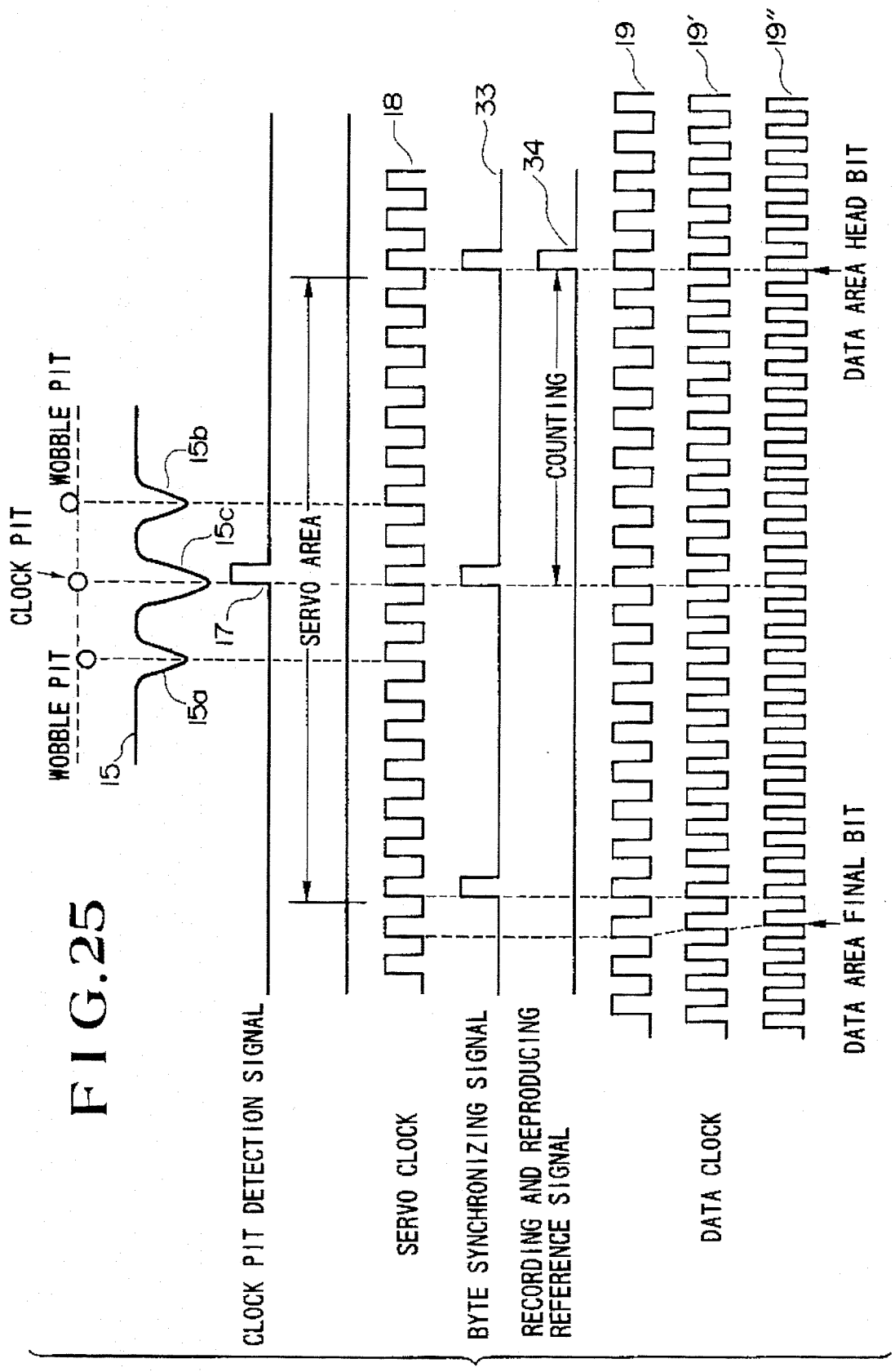
FIG. 25 is a timing chart for explaining the operation of the seventh block configuration diagram of the information recording and reproducing apparatus according to the present invention.

Another example of the information recording and reproducing apparatus is shown in FIG. 24. In FIG. 24, the same components as those of FIG. 20 are denoted by like numerals and description of them will be omitted. An optical disk used in this apparatus is preformatted so that the clock pit signal may be located on the boundary between bytes as shown in FIG. 25. In the same way as in the foregoing example, the servo clock generating circuit 10 of FIG. 24 generates the servo clock 18 by using the clock pit detection signal 17 as the reference signal. Unlike the foregoing example, the data clock generating circuit 11 uses the clock pit detection signal 17 as the reference signal. By preformatting so that the clock pit signal may be located on the head position of the byte, the clock pit detection signal 17 assumes the same timing as that of the byte synchronizing signal 33 in the foregoing example. Thereby, the decoder 85' shown in FIG. 22 becomes unnecessary in the servo clock generating circuit, and the data clock generating circuit functions as a circuit having characteristics independent of those of the servo clock generating circuit. Therefore, the data clock generating circuit is not affected by jitter and the like of the servo clock generating circuit, resulting in improved stability. Further, since both clock generating circuits simultaneously conduct a synchronizing operation at the start, the rise time is advantageously shortened.

In the same way as in the foregoing embodiment, the recording and reproducing reference signal 34 in this embodiment can also be obtained by decoding the output of the frequency counter 84 included in the servo clock generating circuit 10. However, the recording and reproducing reference signal 34 may also be obtained by counting a predetermined number of pulses of the servo clock 18 from the position of the clock pit detection signal 17. Further, as another method, the recording and reproducing reference signal 34 may also be obtained by decoding the output of the frequency counter 104 included in the data clock generating circuit 11. In any method, a recording and reproducing reference signal of high precision can be obtained with a simple configuration. This brings about higher precision of the bit recording position on the disk and enhances the compatibility. Further, in not only the MCAV method but also the CAV or CLV method, in not only a disk-shaped medium but also a tape-like or card-shaped medium, and even in case where the recording density can be improved by future advances in a configuration technique such as a shorter laser wavelength or a shorter wavelength owing to a narrower gap, compatibility with conventional media and apparatuses can be maintained more easily, resulting in an advantage.

<Embodiment 5>

A format of a recording medium realizing a larger recording capacity as compared with the foregoing embodiment, and an information recording and reproducing method and an information recording and reproducing apparatus using this medium, will now be described.

Figure 26:
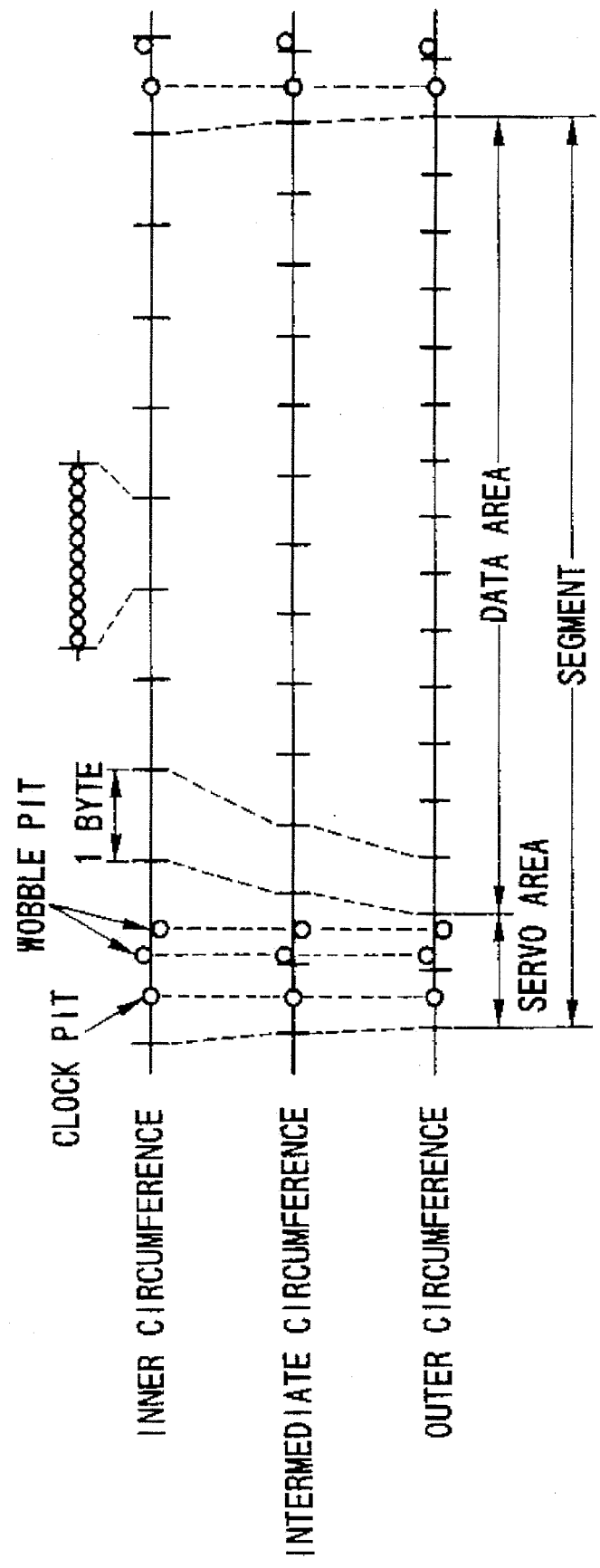
FIG. 26 shows a fifth example of a segment configuration according to the present invention.
Figure 27:
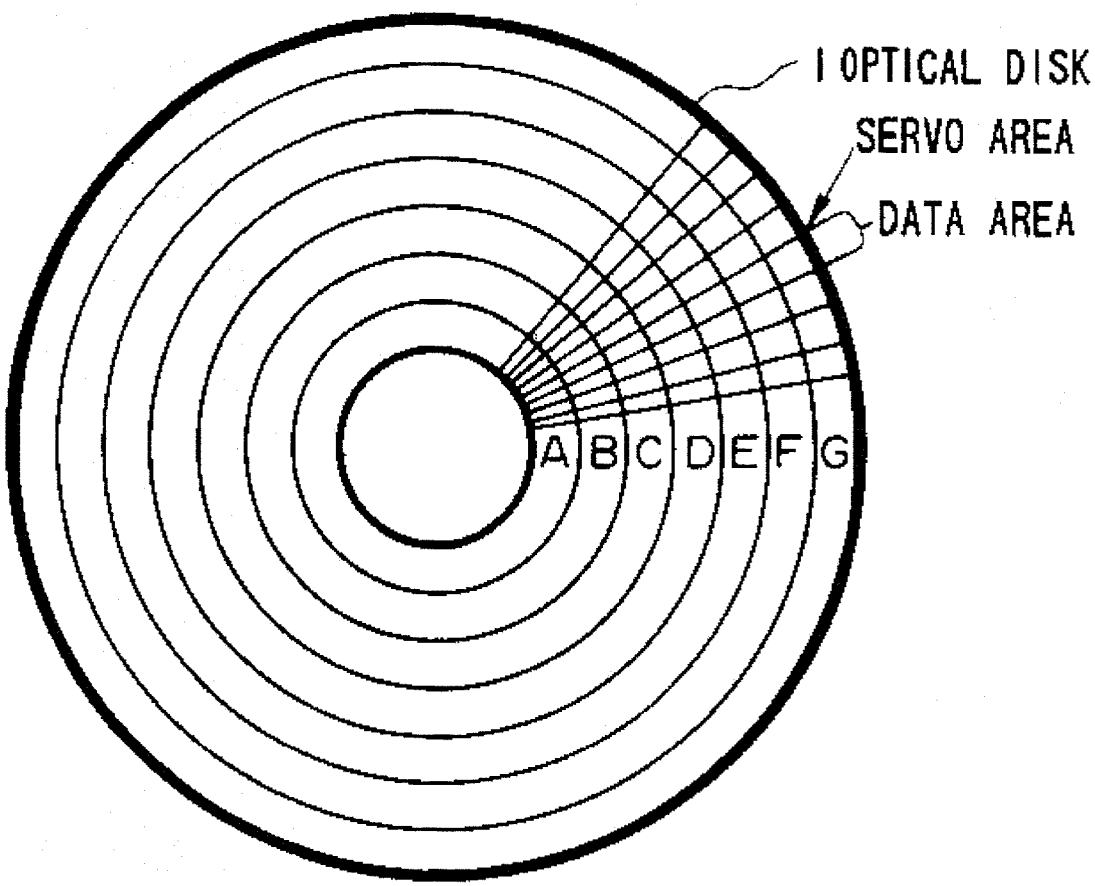
FIG. 27 shows a third example of a configuration of a disk according to the present invention and is a schematic plan view of a medium having a recording and reproducing area divided into a plurality of bands in the radial direction.
Figure 28:
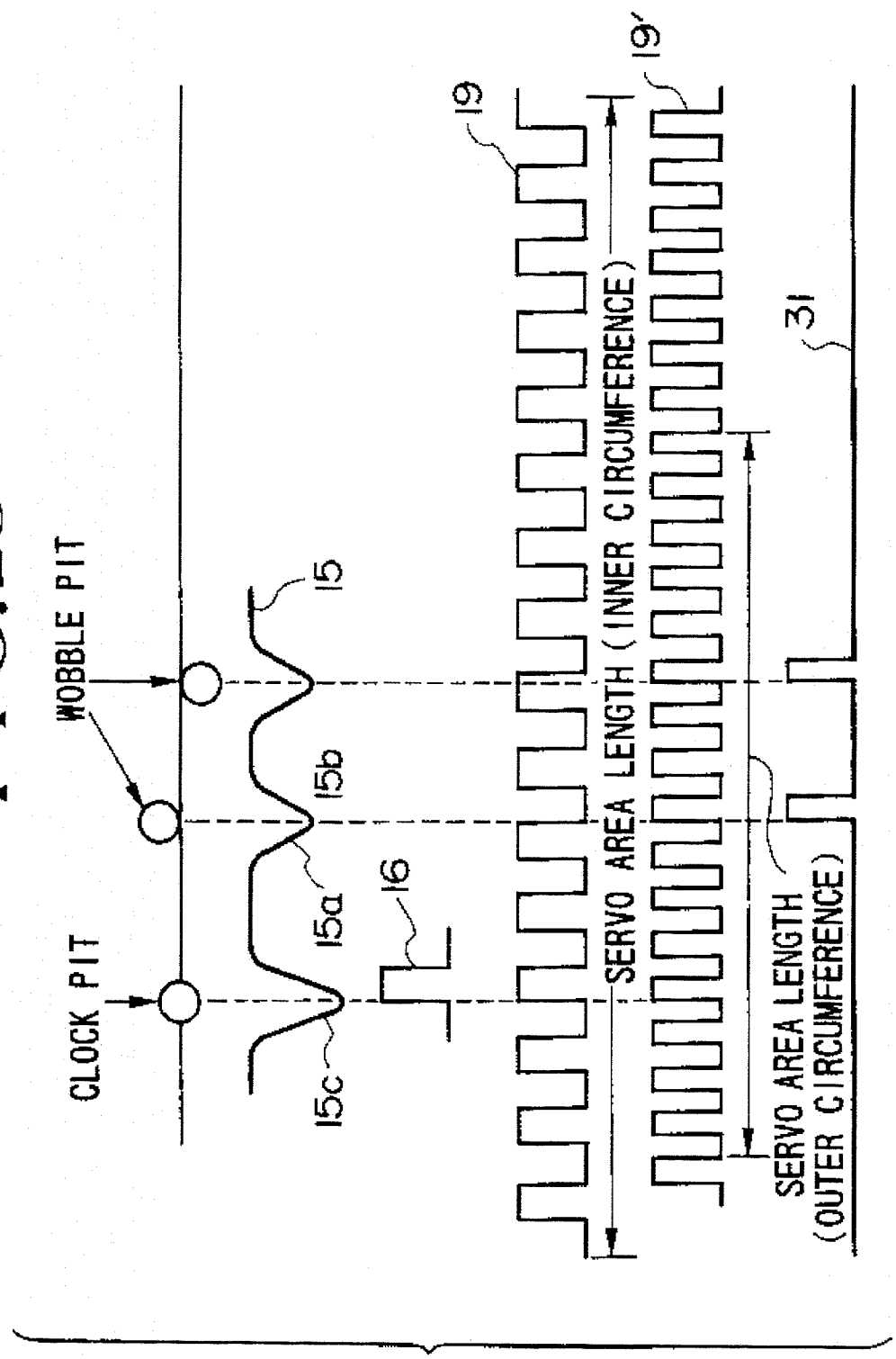
FIG. 28 is a timing chart showing a reproduction signal in the fifth example of a segment configuration according to the present invention.

A new example of a recording medium according to the present invention is shown in FIG. 26. In FIG. 26, the abscissa represents time. As shown in FIG. 27, this medium also takes the shape of a disk and it is divided into a plurality of bands in the radial direction in the same way as in the foregoing example. Each segment is divided into a plurality of areas by taking a byte as the unit and the areas are distributed to a servo area and a data area. As the band is located on an outer circumference, the number of bytes in each segment becomes larger and the time length of each byte becomes shorter. In addition to the clock pit and wobble pits, the above described access marks, mirror section for focusing and unique pattern are also disposed as occasion demands. Since their positions and pattern exert no influence upon the present invention, however, they are not illustrated. The number of bytes of the servo area is constant irrespective of the band. Therefore, the time length of the servo area also becomes shorter as the band is located further out. However, the clock pit and the wobble pits are so arranged as to be aligned in the radial direction. The frequency of the clock for recording and detecting the servo signal may have an arbitrary value so long as it is an integer times as large as the repetition frequency of the clock pit. However, the time length of the servo area becomes shorter as the band is located further out. Therefore, the clock pit and wobble pits are arranged so that the shortest servo area may accommodate the servo signal. Further, relative arrangement of servo signals in the servo area is arbitrary. If positions of the servo signals are brought too close to each other, however, a reproducing optical beam reproduces a plurality of pits at the same time and correct detection cannot be performed. This phenomenon becomes more conspicuous as the band is located on further in. Therefore, arrangement of pits and the number of bytes of the servo area are determined while paying regard to this point. FIG. 28 shows an example of a reproduced waveform. Since wobble pits are already recorded in the same temporal positions from the clock pit over the entire disk area, the wobble pits are always observed in the same positions of the reproduced waveform. In FIG. 28, it is assumed that the wobble pit signals are recorded at the recording and reproducing frequency of the data area in an outer band and they can be detected at the time of reproduction. As described before, however, the clock for detecting servo information is not limited to this.

TABLE 5

| Band | The number of tracks | The number of sectors per track | Capacity [MByte] | The number of bytes per segment | Frequency counter divisor |
|---|---|---|---|---|---|
| A | 1600 | 22 | 17.6 | 10 | 110 |
| B | 1600 | 24 | 19.2 | 11 | 121 |
| C | 1600 | 27 | 21.6 | 12 | 132 |
| D | 1600 | 29 | 23.2 | 13 | 143 |
| E | 1600 | 32 | 25.6 | 14 | 154 |

TABLE 5-continued

| Band | The number of tracks | The number of sectors per track | Capacity [MByte] | The number of bytes per segment | Frequency counter divisor |
|---|---|---|---|---|---|
| F | 1600 | 35 | 28.0 | 15 | 165 |
| G | 1067 | 38 | 20.2 | 16 | 176 |
| | Total | | 155.4 | | |
| | CAV capacity | | 117.3 | | |
| | MCAV/CAV | | 1.32 | | |

Table 5 shows specific examples of numerical values. It is assumed that the number of clocks forming one byte is 11, and the number of clocks forming a servo area is 22, i.e., 2 bytes. It is further assumed that the shortest pit length is 0.8 µm. The diameter of the innermost circumference is 24 mm, and the diameter of the outermost circumference is 40 mm. The number of servo areas per circumference is 1672. The number of bytes per segment changes from 10 to 16. The frequency counter divisor changes from 110 to 176. If a sector forming the unit of data recording and reproducing operation has 608 bytes (inclusive of 512 user bytes) and the track pitch is 1.5 µm, then each of bands A to F has 1600 tracks and the band G has 1067 tracks. As the user data capacity, the value of 155.4 MB is obtained. This is 1.32 times as large as the capacity (CAV capacity) obtained when the configuration of the band A is used over the entire disk.

Figure 29:
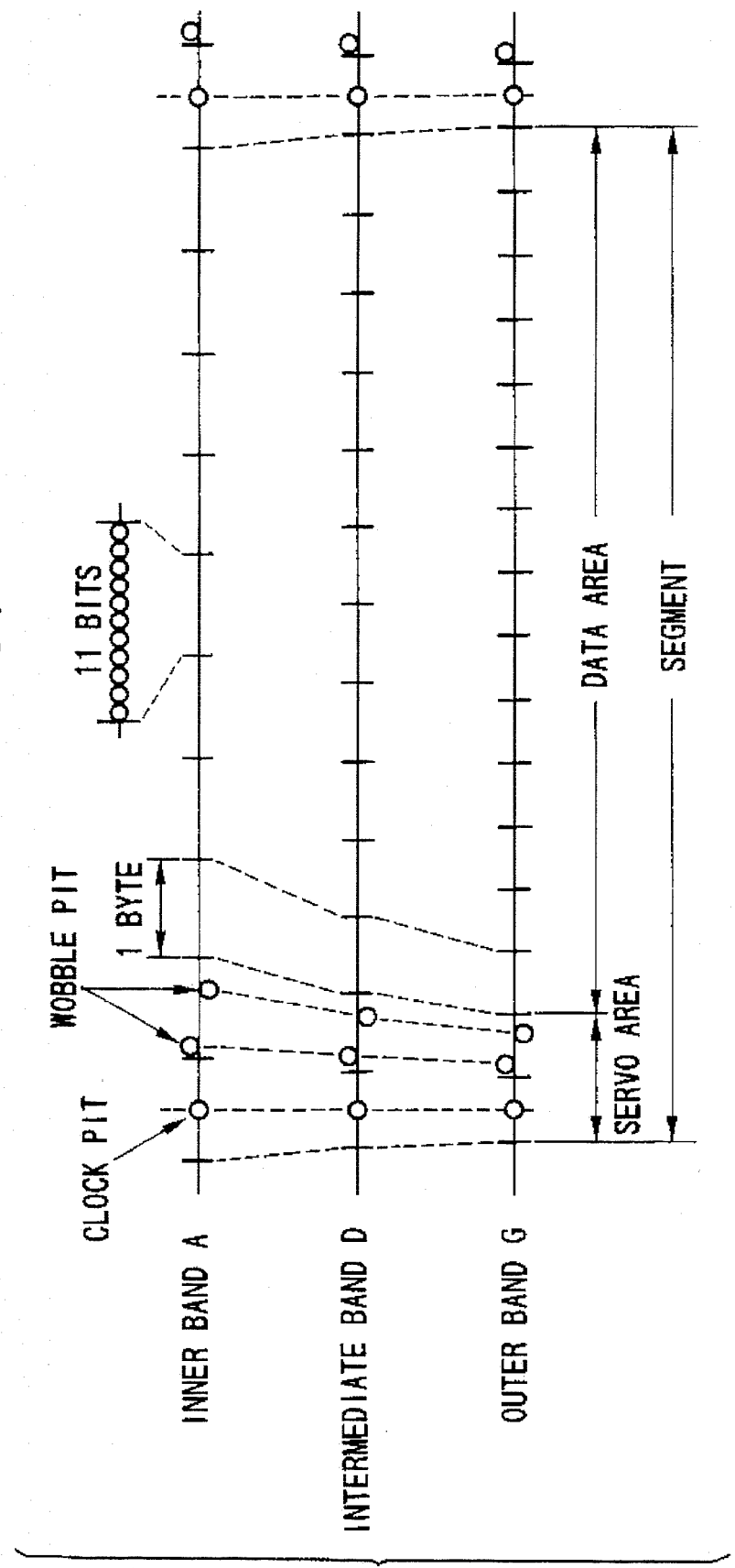
FIG. 29 shows a sixth example of a segment configuration according to the present invention.

A recording medium using another new disk format will now be described. FIG. 29 is a segment configuration diagram showing the new disk format. In FIG. 29 as well, each segment is divided into a plurality of areas while taking a byte as the unit and the areas are distributed to a servo area and a data area in the same way as in FIG. 26. In addition, the disk is divided into 7 bands in the radial direction in the same way as in FIG. 27. Each band also has the same configuration as that shown in Table 5. In the innermost band A, each segment is divided into 10 equal parts to form a servo area having 2 bytes and a data area having 8 bytes. As a band is located further out, the segment length becomes longer and hence more data can be recorded. In an intermediate band D, each segment is divided into 13 equal parts to form a servo area having 2 bytes and a data area having 11 bytes. In the outermost band G, each segment is divided into 16 equal parts to form a servo area having 2 bytes and a data area having 14 bytes. As for the configuration of the servo area, a clock pit and wobble pits are disposed in that order. Further, the above described access marks, mirror section for focusing and unique pattern are also disposed as occasion demands. Since their positions and pattern exert no influence upon the present invention, however, they are not illustrated. The further in the band is located, the shorter the time length of the servo area becomes. In every band, positions of the clock pits are aligned so as to form a straight line in the radial direction of the disk. By using the clock pit as a standard, the position of a wobble pit is prescribed by the number of clocks from the clock pit. Since the clock period differs from band to band, positions of wobble pits align so as to form a straight line in the radial direction within each band, but they do not align between bands.

Figure 30:
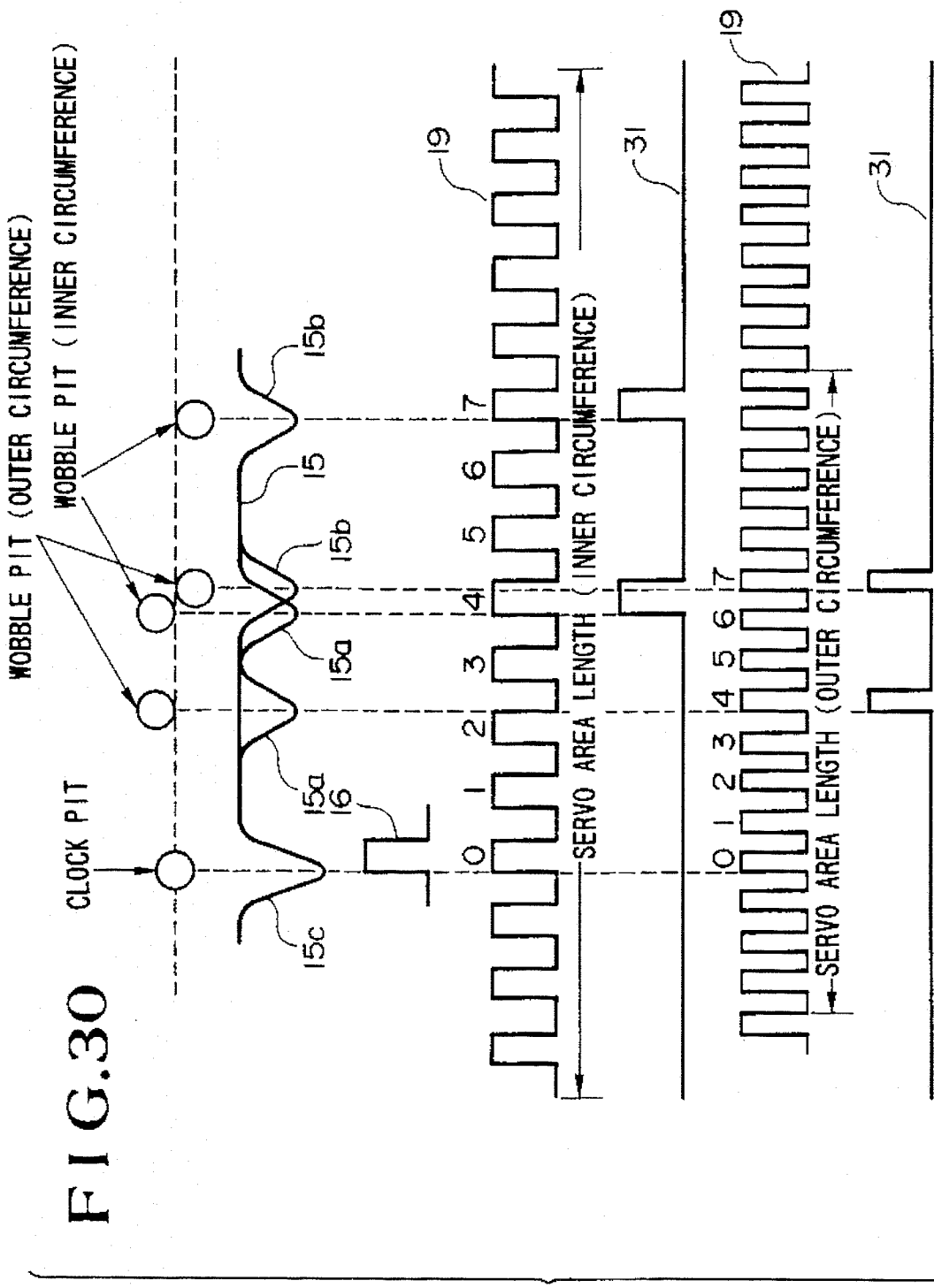
FIG. 30 is a timing chart showing a reproduction signal in the sixth example of a segment configuration according to the present invention.

FIG. 30 shows an example of a reproduced waveform. Wobble bits are set at 4 clocks after the clock pit and 7 clocks after the clock bit. Representation on the time axis with the clock pit taken as a standard results in a reproduced waveform 15 in an inner band and an outer band. Band division is performed so that the number of bytes in each segment may become an integer and the shortest pit length in the innermost track of each band may become equivalent to the shortest pit length in the innermost track of the innermost band. The number of clocks in each segment, i.e., between clock pits, may have an arbitrary value so long as it is an integer. By making it equivalent to a multiple of the number of clocks forming one byte, however, use without waste becomes possible. Therefore, the number of band divisions changes depending upon the shortest pit length for a recording and reproducing operation, the number of clocks forming one byte, the number of clocks forming a servo area, the innermost diameter and the outermost diameter for a recording and reproducing operation, and the number of servo areas per circumference, for example.

Figure 31:
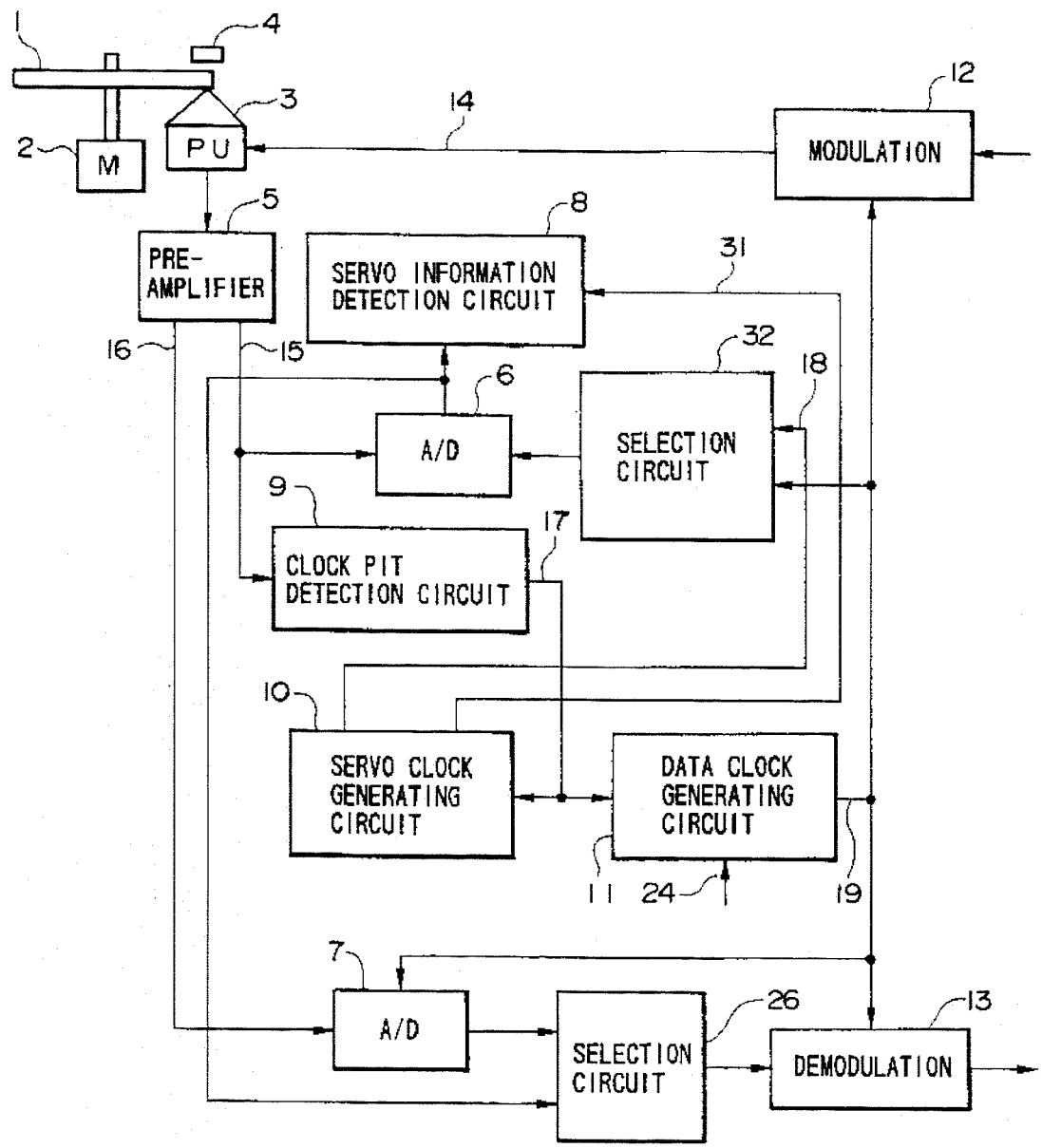
FIG. 31 is a eighth block configuration diagram of the information recording and reproducing apparatus according to the present invention.
Figure 32:
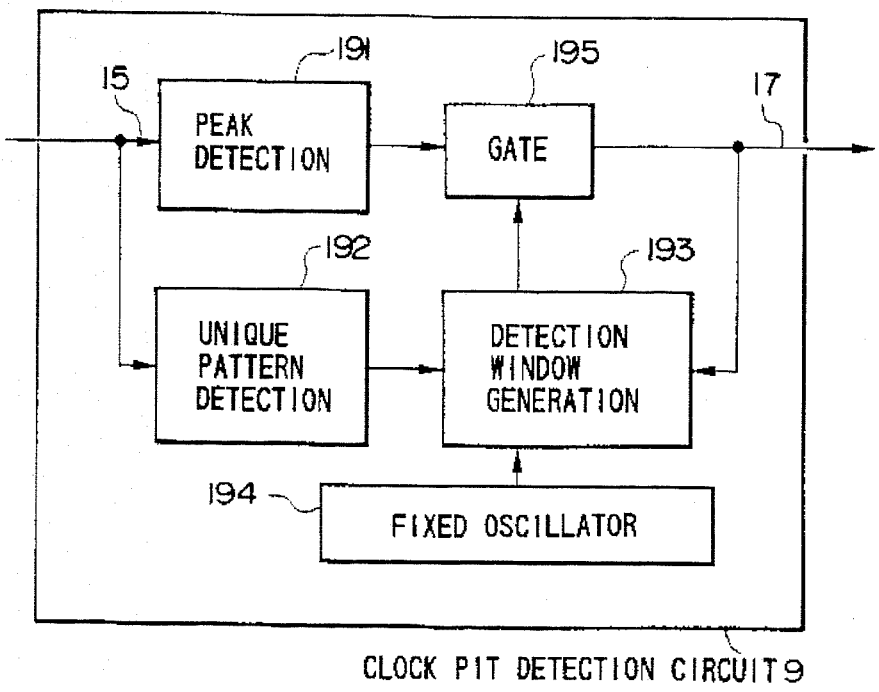
FIG. 32 shows a first example of a configuration of a clock pit detection circuit.
Figure 33:
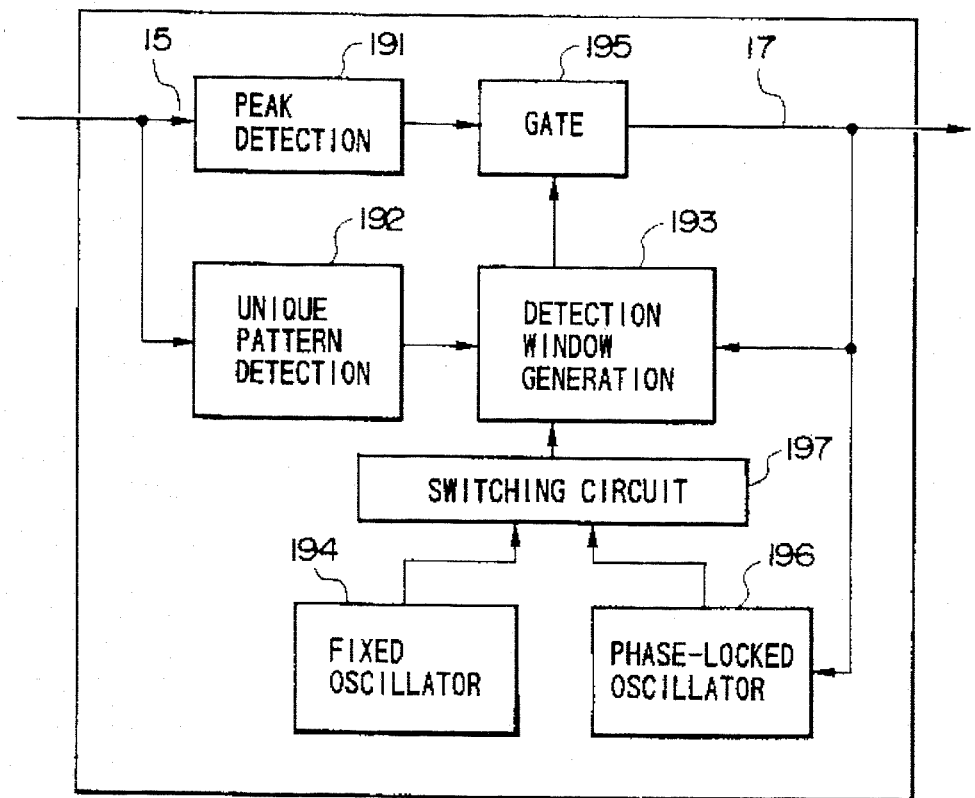
FIG. 33 shows a second example of a configuration of a clock pit detection circuit.

FIG. 31 shows a block diagram of an information recording and reproducing apparatus using the medium of FIG. 26. In FIG. 31, the present invention has been adopted in an optical magnetic disk drive apparatus. The same components as those of FIGS. 1, 14 and 20 are denoted by like numerals and detailed description of them will be omitted. The operation the apparatus is controlled by a controller which is not illustrated. At the start, the motor 2 is rotated to drive the optical disk 1 with a constant angular velocity. Then a laser of the optical pickup 3 energized to enable detection of reflected light of the prepit signal. The reflected light signal 15 amplified by the preamplifier 5 is inputted to the clock pit detection circuit 9 to detect a clock pit. FIG. 32 shows an example of a configuration of the clock pit detection circuit 9. In FIG. 32, numeral 191 denotes a peak detector for detecting the peak position of a clock pit, and numeral 192 denotes a unique pattern detector. Numerals 193 and 194 respectively denote a detection window generator and a fixed oscillator. Numeral 195 denotes a gate for extracting only the peak signal in the detection window interval. Clock pit detection is started with detection of a unique pattern recorded with prepits functioning as the starting point. The unique pattern is disposed before or behind the servo information. However, it is not always necessary to dispose the unique pattern for every servo information. For example, the unique pattern may be disposed for each sector. Since a clock synchronized to the reproduction signal is not obtained at this time point, a pattern which can be detected by an asynchronous clock (such as continuation of "1" or "0" or repetition of a long period) must be used. Further, for making detection of this specific pattern possible no matter which position of the disk the optical pickup 3 is located in, such a pattern that it can be detected by the same clock in every band must be used. If the unique pattern is detected, a detection window for detecting a clock pit is generated by using the unique pattern as a standard and only the clock pit is extracted from the reproduction signal 15. Once a clock pit is detected, the next detection window is generated by using the clock pit as the standard, and hence thereafter clock pits are always detected over the entire disk area. As the clock for generating the detection window, the clock generated by the fixed oscillator such as a crystal oscillator as shown in FIG. 32 which is not in synchronism with the reproduction signal may be continuously used. Alternatively, a phase-locked oscillator 196 using the detected clock pit as the reference signal and a clock switching circuit 197 may be provided as shown in FIG. 33. Once a clock pit is detected in this case after starting and the clock synchronized to the clock pit is obtained, more stable clock pit detection is made possible by using this synchronized clock. Further, instead of this phase-locked oscillator 196, the output 18 of the the servo clock generating circuit 10 which will be described later may be used. The clock pit detection signal 17 thus obtained is inputted to the data clock generating circuit 11 and the servo clock generating circuit 10 as the reference signal thereof. In the same way as in FIG. 22, the data clock generating circuit 11 has an output clock frequency changed by an external signal. In the same way as in the data clock generating circuit 11, the servo clock generating circuit 10 is also a PLL. Since its frequency counter divisor is fixed, however, the servo clock generating circuit 10 need not have the variable frequency counter divisor function of the frequency counter 104 as shown in FIG. 23. With reference to FIG. 31, the servo clock output 18 of the servo clock generating circuit 10 is inputted to the A/D converter 6 to perform digital conversion of the reflected optical signal. The servo information timing signal 31 generated by the servo clock generating circuit 10 is inputted to the servo information detection circuit 8 to detect servo information. ID information obtained by the reflected optical signal is recorded with the same data clock frequency as that of postscript data. As shown in FIG. 31, either the servo clock 18 outputted from the servo clock generating circuit 10 or the data clock 19 outputted from the data clock generating circuit 11 is switched by a selection circuit 32 so as to be inputted to the A/D converter 6.

Figure 34:
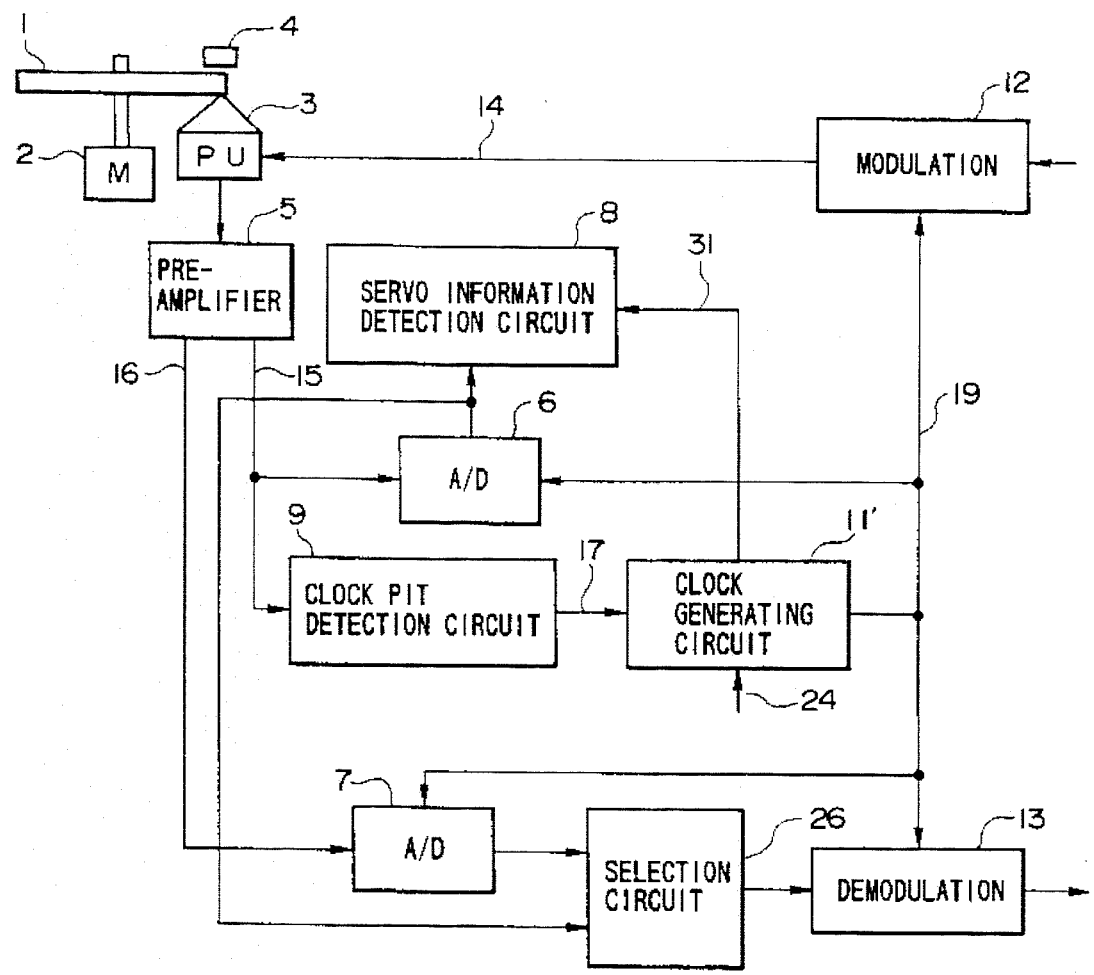
FIG. 34 is a ninth block configuration diagram of the information recording and reproducing apparatus according to the present invention.
Figure 35:
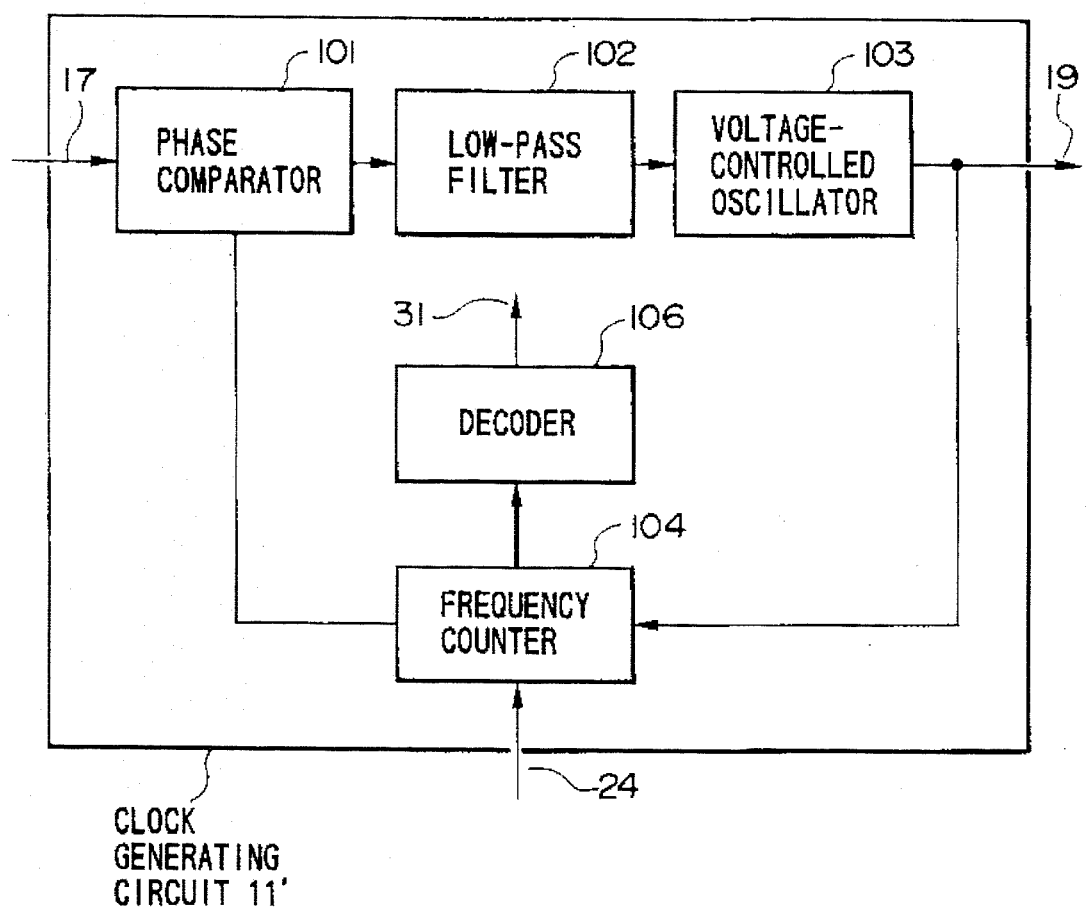
FIG. 35 shows an example of configuration of a clock generating circuit in the ninth block configuration diagram of the information recording and reproducing apparatus according to the present invention.

FIG. 34 shows an example of a configuration of a drive apparatus using an optical disk having the format shown in FIG. 29. In FIG. 34 as well, components having the same functions as those of FIGS. 1, 11, 14, 20 and 31 are denoted by like numerals, and description of the same will be omitted. The clock pit detection signal 17 is inputted to a clock generating circuit 11' to generate the clock 19 which is used to reproduce servo information and record and reproduce user data. An example of a configuration of the clock generating circuit 11' is shown in FIG. 35. The circuit of FIG. 35 forms a PLL. The same components as those of FIG. 23 are denoted by like numerals. The outputted clock 19 has a frequency which is a frequency counter divisor times as high as that of the inputted clock pit detection signal 17 and has a phase synchronized to that of the clock pit detection signal 17. In the case of Table 5, the frequency counter divisor is 110 in the band A. Therefore, the clock 19 has a frequency which is 110 times the repetition frequency of the clock pit signal 17. Switching of the frequency counter divisor of the frequency counter 104 is performed by the control signal 24 supplied from a controller (not illustrated). A frequency counter divisor corresponding to the band whereto the optical pickup 3 is applying laser light is set. The clock 19 is supplied to the A/D converter 6 to convert the reflected analog optical signal 15 to a digital signal. The servo information timing signal 31 obtained by decoding the output of the frequency counter 104 in a decoder 106 is supplied to the servo information detection circuit 8 to detect servo information. In every band, the distance between the clock pit and a wobble pit is equivalent to the same number of clocks of that band as described before. By forming the frequency counter 104 with a counter circuit for counting clocks starting from the clock pit, therefore, the decoder 106 need not switch the decode value from band to band. The output of the A/D converter 6 is supplied to the selection circuit 26 as well. The ID signal of the sector formed by prepits is thus supplied to the demodulation circuit 13. The clock 19 is supplied to the A/D converter 7, the demodulation circuit 13 and the modulation circuit 12 as well at the same time. The A/D converter 7 converts the signal 16 detected by optical magnetic effect to a digital signal. The output of the A/D converter 7 is supplied to the demodulation circuit 13 via the selection circuit 26. The demodulation circuit 13 demodulates its input signal in accordance with a predetermined rule and supplies a resultant signal to a higher rank apparatus (not illustrated). The modulation circuit 12 modulates data supplied from the higher rank apparatus by using the clock 19 in accordance with a predetermined rule and supplies a resultant signal to the optical pickup 3 as the recording signal 14.

For setting the frequency counter divisor of the frequency counter 104, it is necessary to know the position of the optical pickup 3. As the method for detecting the position of the optical pickup, there are typically a method of detecting the position of the optical pickup directly by an external scale and a method of detecting the position of the optical pickup by referring to the track number of the sector recorded on the disk. For the purpose of reducing the apparatus size, however, the external scale tends to be not used. Further, for detecting the track number, a correct frequency counter divisor setting, correct servo information detection, and correct focus and tracking control are required. Therefore, the method of detecting the track number is not effective to the position detection for setting the frequency counter divisor. As a solution, at the time of seeking, it is decided beforehand which band the desired track belongs to and a frequency counter divisor is set. When an out-of-servo state has occurred at the start or for some reason, frequency counter divisors of respective bands are set one after another. When servo information is correctly detected and the track number and the sector number can be read, the position of the optical pickup 3 can be definitely fixed. As another method, the optical pickup is forcibly moved to the innermost band or the outermost band and the frequency counter divisor of the innermost band or the outermost band is set to detect servo information. After these operations, the drive apparatus is brought into the stand-by state.

Any of the embodiments heretofore described relates to an optical magnetic disk and its drive apparatus. However, the application range of the present invention is not limited to them. The present invention can be applied to a perforated optical disk and its drive apparatus, an optical disk of the phase change type and its drive apparatus, and various disks such as a ROM disk on which all data are recorded by prepits and a partial ROM disk having a mixture of a ROM area, a rewriting area, and a write once area on its single disk, and drive apparatuses using these disks.

<Embodiment 6>

Figure 36:
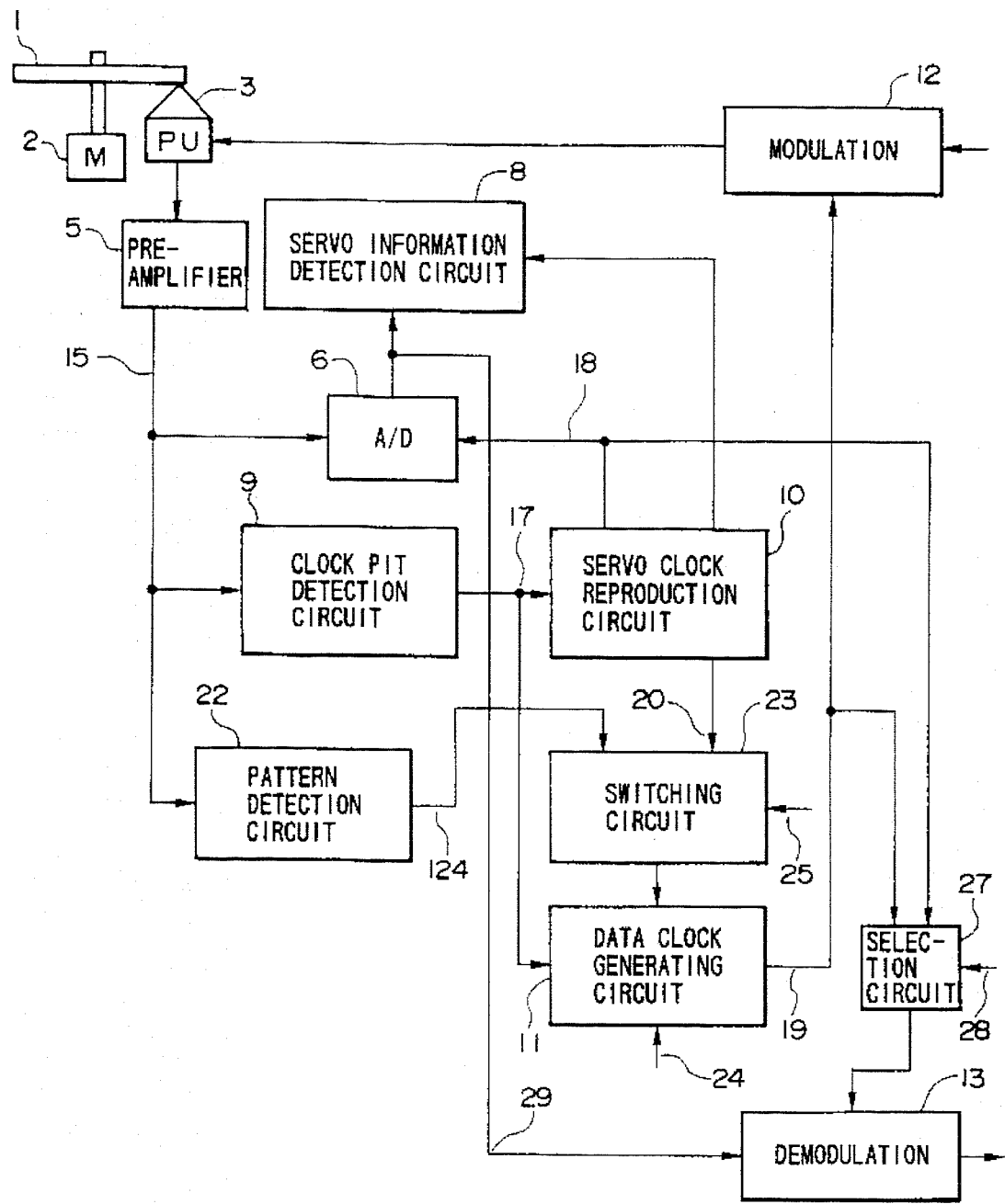
FIG. 36 is a tenth block configuration diagram of an information recording and reproducing apparatus using a perforated ROM optical disk of the phase change type.

FIG. 36 shows an example of an information recording and reproducing apparatus using a ROM optical disk of the perforated phase change type. In FIG. 36 as well, the same components as those of the above described FIGS. 1, 11 and 14 are denoted by like numerals. The portion performing the same operation will not be described. In these optical disks, data are read as a change of the quantity of reflected light in the same way as the servo prepit signal. FIG. 36 shows an example in which the A/D converter used for digital conversion of the reproduced signal is formed by a single A/D converter 6. As for the conversion clock, the servo clock 18 or the data clock 19 is switched by a selection circuit 27 so as to be used depending upon whether the area is the servo area or the data area. As a matter of course, two A/D converters may also be used as in the above described example.

In accordance with the present invention, an information recording medium using the sample servo method is divided into a plurality of bands in the radial direction and a different information recording period is set for each band as heretofore described. Thereby, an information recording medium, an information recording and reproducing method, and an information recording and reproducing apparatus making it possible to increase the recording capacity as compared with a medium whereto recording is always conducted at intervals of a constant period.

Further, the width of each band in the radial direction is set so that the number of data recorded in the data area sandwiched between servo areas may differ between adjacent bands while taking one byte as the unit. Thereby, an information recording medium, an information recording and reproducing method, and an information recording and reproducing apparatus making it possible to increase the recording capacity efficiently can be realized.

Further, while keeping the time length of the servo area constant irrespective of the band, adjustment of the position and phase of recording and reproducing data is facilitated without the necessity of providing a gap between the servo area and the data area. Alternatively, the time length of the servo area is made variable according to the band. Thereby, an information recording medium, an information recording and reproducing method, and an information recording and reproducing apparatus making it possible to increase the recording capacity most efficiently can be realized.

In addition, the head position of at least one sector included in sectors of each track is aligned in the radial direction. Thereby, an information recording medium, an information recording and reproducing method, and an information recording and reproducing apparatus making it possible to shorten the detection pull-in time of a sector can be realized.

Further, the sector mark and ID information at the head of each sector are recorded and reproduced with the same data period as that of servo information. Thereby, an information recording medium, an information recording and reproducing method, and an information recording and reproducing apparatus shortening the time for sector detection and ID information reading can be realized.

We claim:

1. An information reproducing apparatus for reproducing information from a disk-shaped information recording medium, the disk-shaped information recording medium including a plurality of tracks grouped into a plurality of bands, the bands being disposed in a radial direction of the disk-shaped information recording medium extending from an innermost band to an outermost band, and a plurality of servo sections and a plurality of data sections disposed on the tracks such that servo sections and data sections are alternately disposed on each of the tracks with the servo sections on each of the tracks being disposed at predetermined angular intervals, each of the servo sections including wobble pits disposed on opposite sides of a center of a respective track on which the servo section is disposed, the information reproducing apparatus comprising:

driving means for driving the disk-shaped information recording medium at a predetermined angular velocity;

servo reproducing means for reproducing a servo reproduction signal from the servo sections;

a clock reference signal generating circuit for generating a clock reference signal based on the servo reproduction signal;

a servo clock generating circuit for generating a servo clock based on the clock reference signal;

a data clock generating circuit for generating a data clock based on the clock reference signal; and data reproducing means for reproducing a data reproduction signal from the data sections based on the data clock;

wherein the data clock has a frequency which is constant for a same band and increases at each transition from one band to an outer adjacent band; and wherein the data clock divides each of the servo sections in a same band into an integral number of equal divisions each corresponding to a data clock interval, and divides each of the data sections in a same band into an integral number of equal divisions each corresponding to a data clock interval.

2. An information reproducing apparatus according to claim 1, wherein a phase of the servo clock coincides with a phase of the data clock at predetermined intervals.

3. An information reproducing apparatus for reproducing information from a disk-shaped information recording medium, the disk-shaped information recording medium including a plurality of tracks grouped into a plurality of bands, the bands being disposed in a radial direction of the disk-shaped information recording medium extending from an innermost band to an outermost band, and a plurality of servo sections and a plurality of data sections disposed on the tracks such that servo sections and data sections are alternately disposed on each of the tracks with the servo sections on each of the tracks being disposed at predetermined angular intervals, each of the servo sections including wobble pits disposed on opposite sides of a center of a respective track on which the servo section is disposed, the information reproducing apparatus comprising:

driving means for driving the disk-shaped information recording medium at a predetermined angular velocity;

servo reproducing means for reproducing a servo reproduction signal from the servo sections;

a clock reference signal generating circuit for generating a clock reference signal based on the servo reproduction signal;

a servo clock generating circuit for generating a servo clock based on the clock reference signal;

a data clock generating circuit for generating a data clock based on the clock reference signal; and data reproducing means for reproducing a data reproduction signal from the data sections based on the data clock;

wherein the data clock has a frequency which is constant for a same band and increases at each transition from one band to an outer adjacent band; and wherein the data clock divides each of the data sections in a same band into an integral number of equal divisions each corresponding to a data clock interval.

4. An information reproducing apparatus for reproducing information from a disk-shaped information recording medium, the disk-shaped information recording medium including a plurality of tracks grouped into a plurality of bands, the bands being disposed in a radial direction of the disk-shaped information recording medium extending from an innermost band to an outermost band, and a plurality of servo sections and a plurality of data sections disposed on the tracks such that servo sections and data sections are alternately disposed on each of the tracks with the servo sections on each of the tracks being disposed at predetermined angular intervals, each of the servo sections including wobble pits disposed on opposite sides of a center of a respective track on which the servo section is disposed, the servo sections and the data sections being grouped into segments such that each of the segments includes one servo section and one data section immediately following the one servo section on a same track, the segments on each of the tracks being grouped into a plurality of sectors each constituted by an integral number of segments, the integral number of segments constituting one sector being constant within a same band and decreasing at each transition from one band to an outer adjacent band, a maximum amount of data recorded in one sector being constant regardless of band, a product of the integral number of segments constituting one sector in each of the bands and a data storage capacity of one data section in a same band being equal to or greater than the maximum amount of data recorded in one sector, the information reproducing apparatus comprising:

driving means for driving the disk-shaped information recording medium at a predetermined angular velocity;

servo reproducing means for reproducing a servo reproduction signal from the servo sections;

a clock reference signal generating circuit for generating a clock reference signal based on the servo reproduction signal;

a servo clock generating circuit for generating a servo clock based on the clock reference signal;

a data clock generating circuit for generating a data clock based on the clock reference signal; and data reproducing means for reproducing a data reproduction signal from the data sections based on the data clock.

5. An information reproducing apparatus for reproducing information from a disk-shaped information recording medium, the disk-shaped information recording medium including a plurality of tracks grouped into a plurality of bands, the bands being disposed in a radial direction of the disk-shaped information recording medium extending from an innermost band to an outermost band, and a plurality of servo sections and a plurality of data sections disposed on the tracks such that servo sections and data sections are alternately disposed on each of the tracks with the servo sections on each of the tracks being disposed at predetermined angular intervals, each of the servo sections including wobble pits disposed on opposite sides of a center of a respective track on which the servo section is disposed, the servo sections and the data sections being grouped into segments such that each of the segments includes one servo section and one data section immediately following the one servo section on a same track, the segments on each of the tracks being grouped into a plurality of sectors each constituted by an integral number of segments, the information reproducing apparatus comprising:

driving means for driving the disk-shaped information recording medium at a predetermined angular velocity;

servo reproducing means for reproducing a servo reproduction signal from the servo sections;

a clock reference signal generating circuit for generating a clock reference signal based on the servo reproduction signal;

a servo clock generating circuit for generating a servo clock based on the clock reference signal;

a data clock generating circuit for generating a data clock based on the clock reference signal; and data reproducing means for reproducing a data reproduction signal from the data sections based on the data clock;

wherein the data clock divides each of the segments in a same band into N equal divisions each corresponding to a data clock interval;

wherein each of the servo sections has a storage capacity of $B_S$ bytes of recorded data, each of the data sections has a storage capacity of $B_M$ bytes of recorded data, $B_M$ being constant within a same band and being equal to $B_D$ in the innermost band, each of the $B_M$ bytes of recorded data being constituted by $b_c$ channel bits; and wherein N is defined by the following equation:

$$N = \frac{B_D + B_S}{B_D} \cdot B_M \cdot b_c.$$

6. An information reproducing apparatus for reproducing information from a disk-shaped information recording medium, the disk-shaped information recording medium including a plurality of tracks grouped into a plurality of bands, the bands being disposed in a radial direction of the disk-shaped information recording medium extending from an innermost band to an outermost band, and a plurality of servo sections and a plurality of data sections disposed on the tracks such that servo sections and data sections are alternately disposed on each of the tracks with the servo sections on each of the tracks being disposed at predetermined angular intervals, each of the servo sections including wobble pits disposed on opposite sides of a center of a respective track on which the servo section is disposed, the servo sections and the data sections being grouped into segments such that each of the segments includes one servo section and one data section immediately following the one servo section on a same track, the segments on each of the tracks being grouped into a plurality of sectors each constituted by an integral number of segments, a specific pattern being recorded in the data section of one of the segments of each of the sectors, the information reproducing apparatus comprising:

driving means for driving the disk-shaped information recording medium at a predetermined angular velocity;

servo reproducing means for reproducing a servo reproduction signal from the servo sections;

a clock reference signal generating circuit for generating a clock reference signal based on the servo reproduction signal;

a servo clock generating circuit for generating a servo clock based on the clock reference signal;

a data clock generating circuit for generating a data clock based on the clock reference signal;

data reproducing means for reproducing a data reproduction signal from the data sections based on the data clock, the data reproduction signal including a specific pattern signal representing the specific pattern; and a pattern detecting circuit for detecting the specific pattern signal in the data reproduction signal, and generating a reproducing synchronizing signal when the specific pattern signal is detected;

wherein the data clock generating circuit synchronizes the data clock with the data reproduction signal based on the reproducing synchronizing signal.

7. An information reproducing apparatus according to claim 6, wherein each of the sectors includes a user data area constituted by a plurality of the segments of the sector; and wherein the specific pattern is recorded in the data section of one of the segments of the user data area of each of the sectors, the one segment being disposed at the head of the user data area.

* * * * *